United States Patent
Eguchi et al.

(10) Patent No.: US 8,570,662 B2
(45) Date of Patent: Oct. 29, 2013

(54) ZOOM LENS AND IMAGE PICKUP APPARATUS INCLUDING THE SAME

(75) Inventors: Kaoru Eguchi, Utsunomiya (JP); Norihito Hiasa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/298,544

(22) Filed: Nov. 17, 2011

(65) Prior Publication Data

US 2012/0134031 A1    May 31, 2012

(30) Foreign Application Priority Data

Nov. 25, 2010  (JP) .................................. 2010-262292

(51) Int. Cl.
G02B 15/14  (2006.01)
H04N 5/225  (2006.01)

(52) U.S. Cl.
USPC ............................ 359/684; 359/683; 348/340

(58) Field of Classification Search
CPC .............................. G02B 15/17; G02B 15/173
USPC ................... 348/340; 359/683, 684, 686, 687
See application file for complete search history.

(56) References Cited

U.S. PATENT DOCUMENTS

| 6,278,559 | B1 | 8/2001 | Yahagi |
| 7,206,137 | B2 | 4/2007 | Nakatani et al. |
| 7,672,062 | B2 | 3/2010 | Nagahara et al. |
| 7,864,443 | B2 | 1/2011 | Sudoh et al. |
| 8,441,738 | B2 * | 5/2013 | Ohmoto ................ 359/683 |
| 2012/0224270 | A1 * | 9/2012 | Sakamoto .............. 359/688 |

* cited by examiner

*Primary Examiner* — David N Spector
(74) *Attorney, Agent, or Firm* — Canon U.S.A., Inc. IP Division

(57) ABSTRACT

A zoom lens includes, in order from an object side to an image side, a first lens unit having positive refractive power, a second lens unit having negative refractive power, a third lens unit having positive or negative refractive power, and a rear lens group including one or more lens units, an aperture stop is provided on the image side of the second lens unit. A sum of relative anomalous partial dispersion $\Delta\theta gF$ of materials of negative lenses included in the second lens unit, a sum of power of a negative lens formed of a material having relative anomalous partial dispersion that is equal to or more than an average value of relative anomalous partial dispersion of the materials of the negative lenses included in the second lens unit, and a refractive power of the second lens unit are appropriately set.

10 Claims, 16 Drawing Sheets

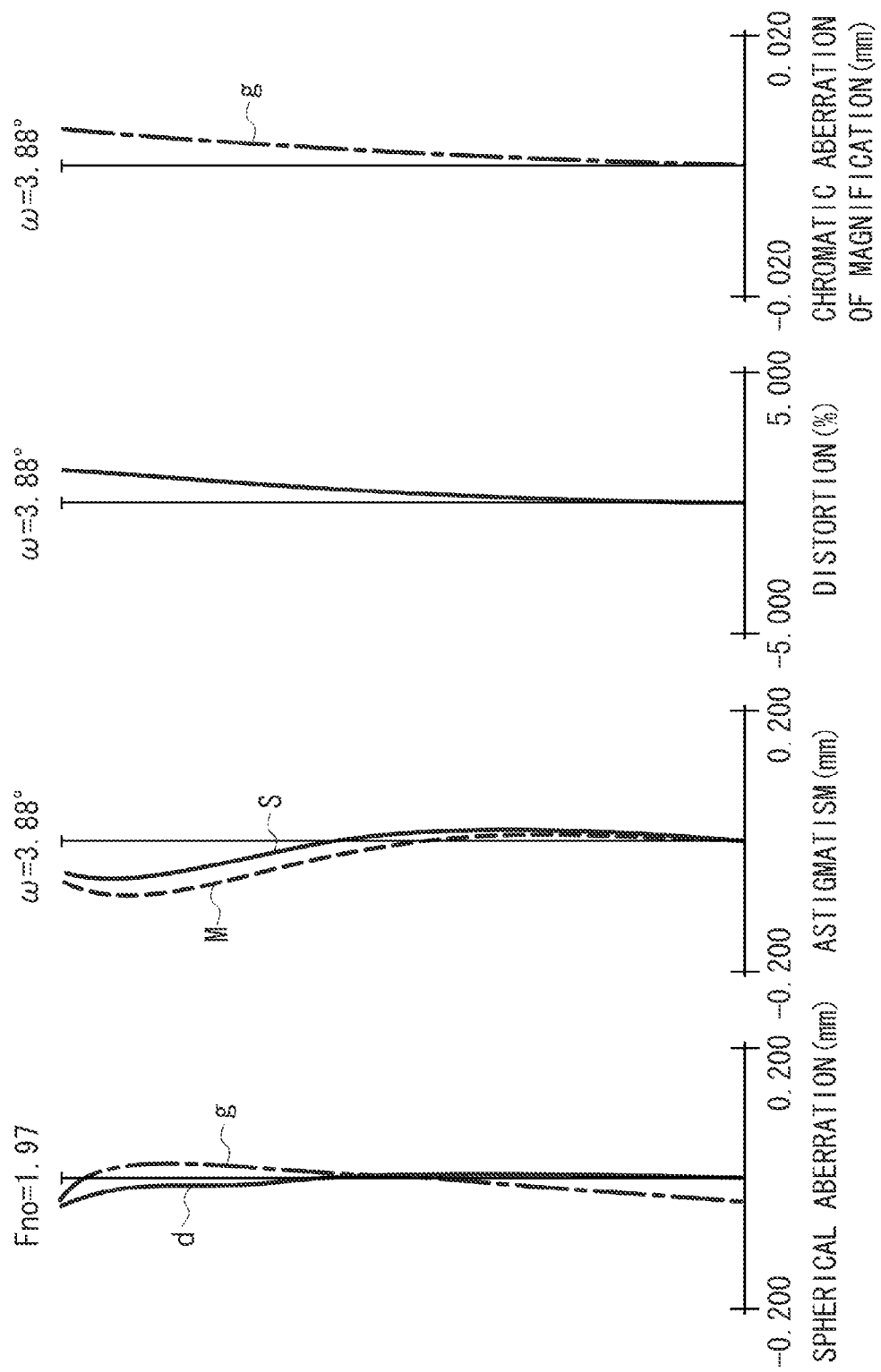

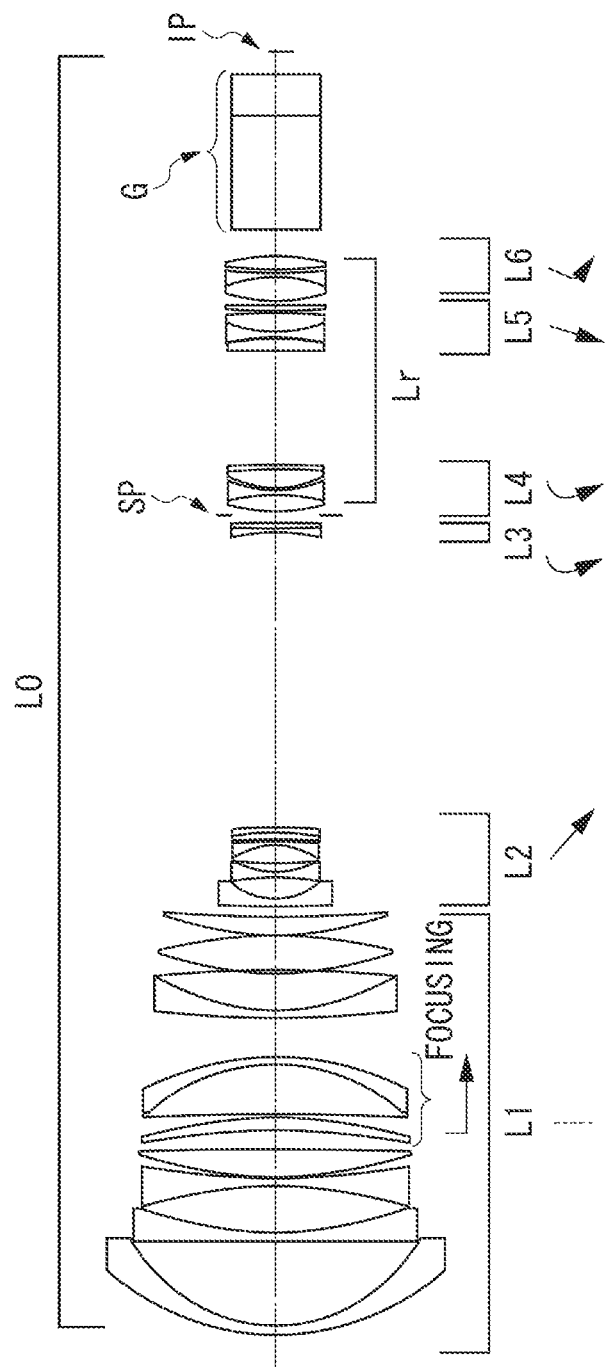

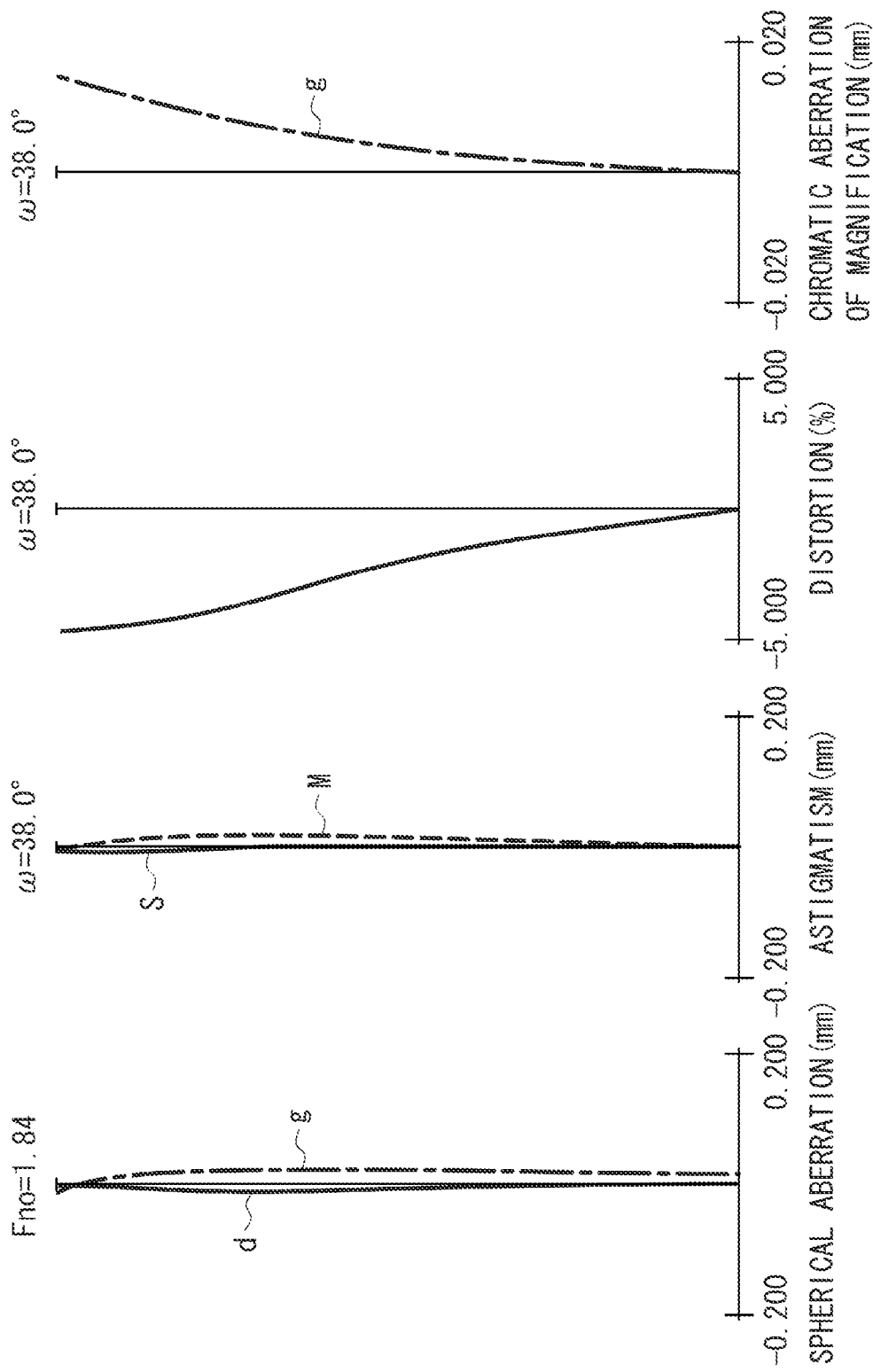

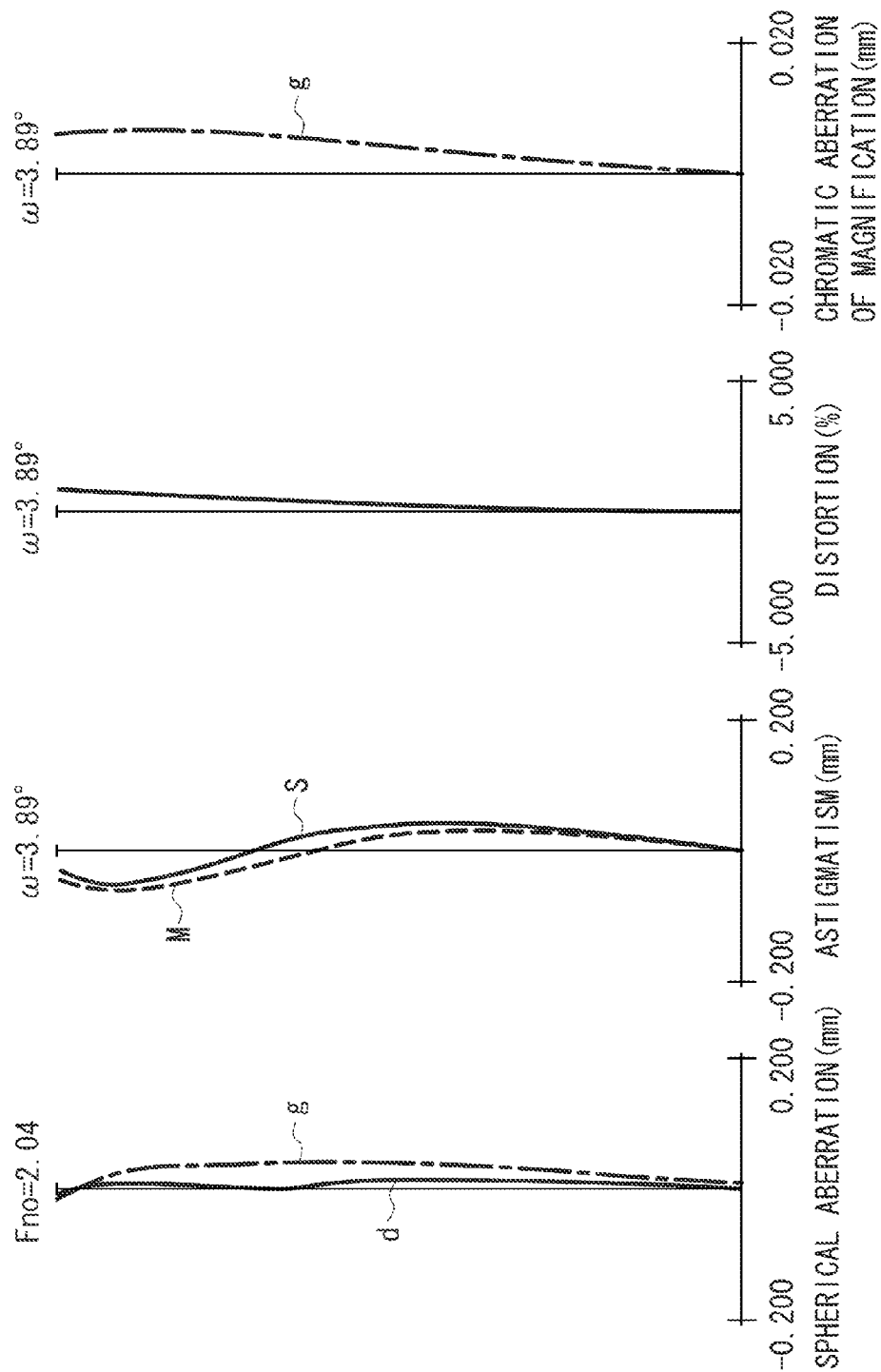

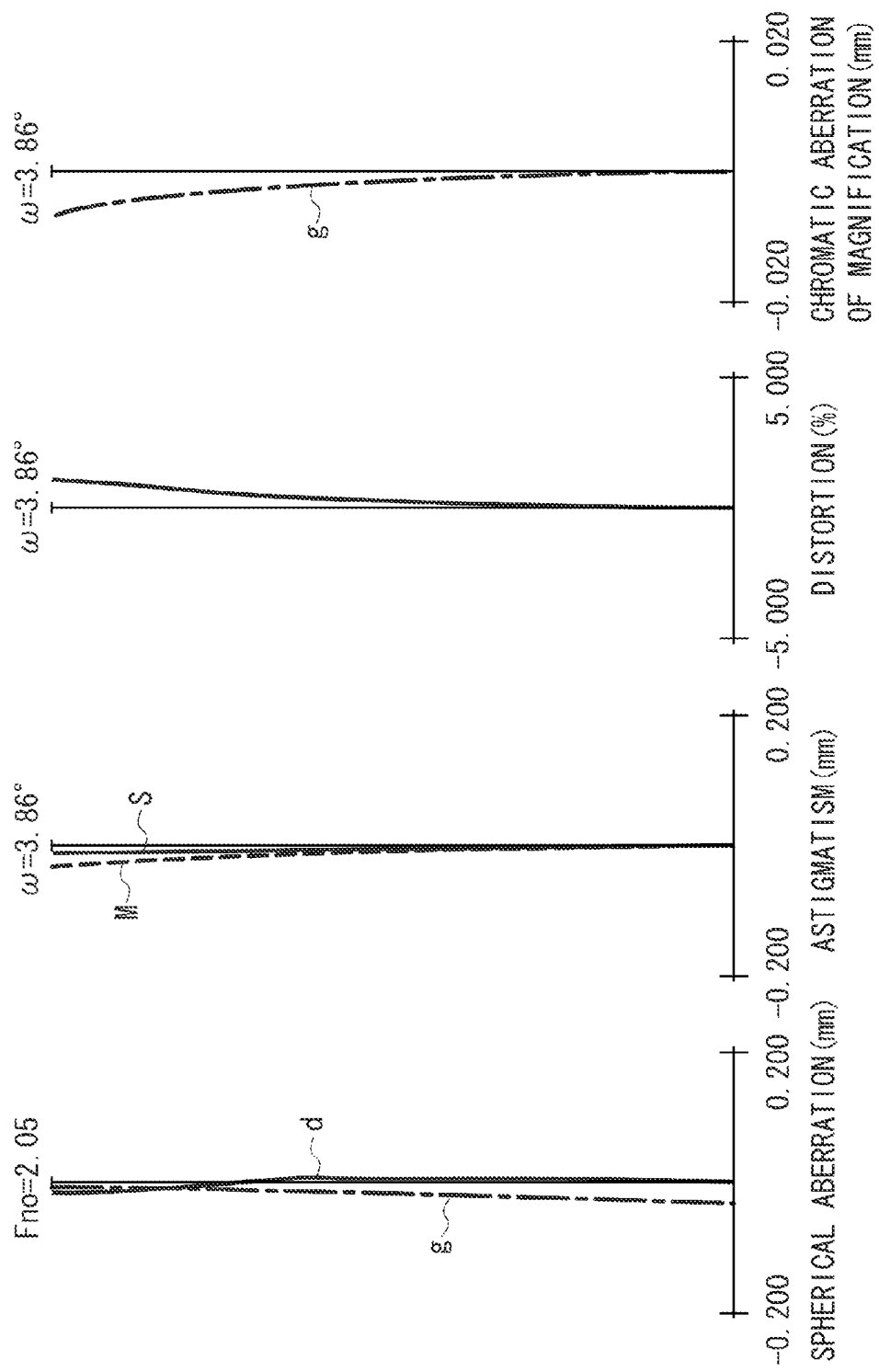

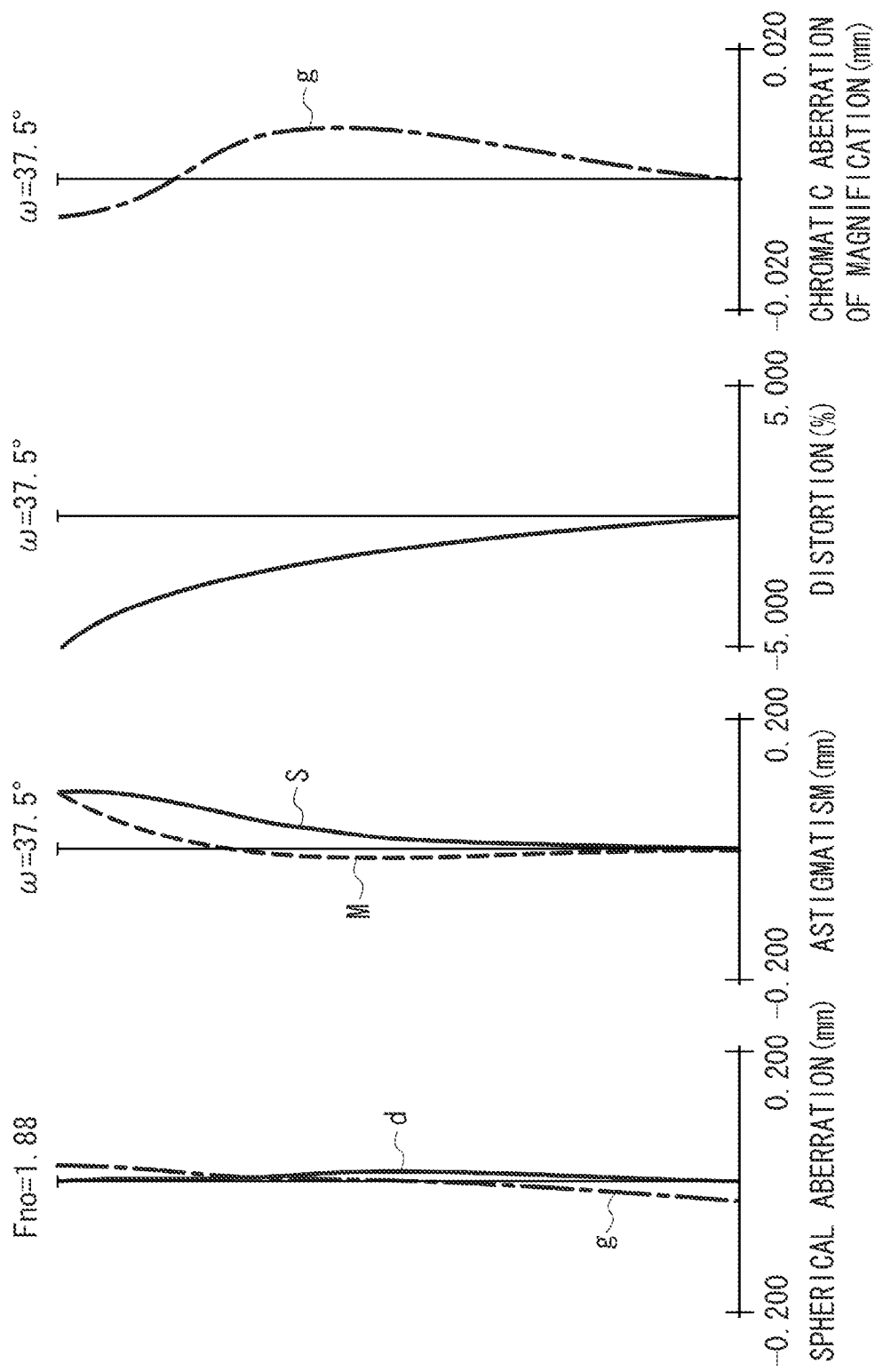

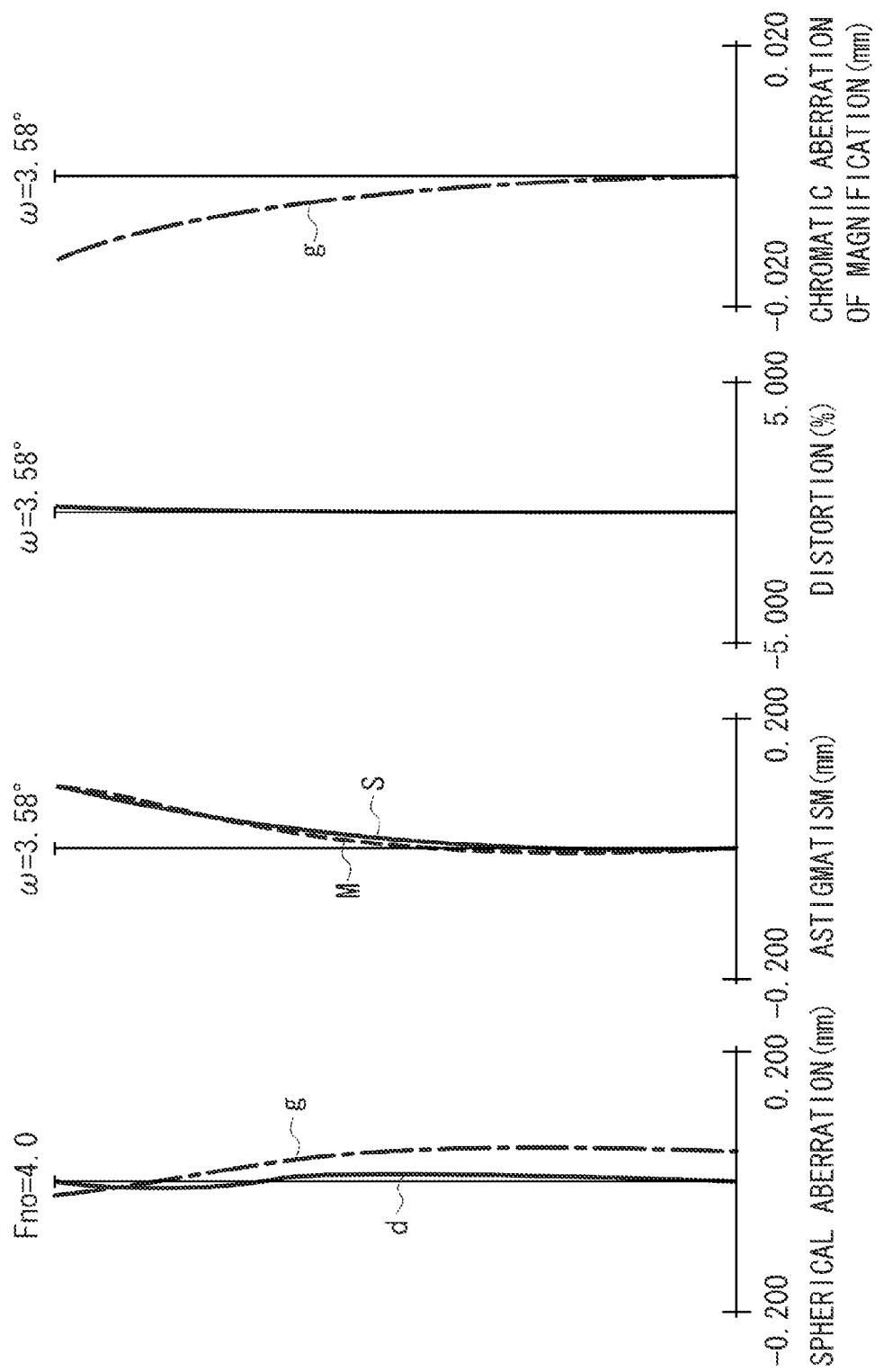

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same. For example, the zoom lens is suitable for an image pickup apparatus, such as a video camera, an electronic still camera, a broadcasting camera, and a monitoring camera, which uses a solid-state image sensor, or an image pickup apparatus such as a camera which uses a silver-halide film.

2. Description of the Related Art

In recent years, there have been remarkable advances in the function of an image pickup apparatus, such as a video camera, a digital still camera, a broadcasting camera, and a monitoring camera, which uses a solid-state image sensor and in the function of a camera which uses a silver-halide film. Therefore, as a photographic optical system used therein, there has been a demand for a zoom lens having a high zoom ratio (a high magnification variation ratio) and a high resolution over the entire zoom range. As a zoom lens satisfying such a demand, there is known a positive lead type zoom lens that includes the following in order from an object side to an image side: first, second, and third lens units respectively having positive refractive power, negative refractive power, and positive or negative refractive power, and a rear lens group having one or more lens units subsequent thereto.

As the positive lead type zoom lens, there is known a zoom lens that includes four lens units respectively having positive refractive power, negative refractive power, positive refractive power, and positive refractive power in order from an object side to an image side (U.S. Pat. No. 7,206,137). Further, there is known a zoom lens that includes five lens units respectively having positive refractive power, negative refractive power, negative refractive power, positive refractive power, and positive refractive power in order from an object side to an image side (U.S. Pat. No. 6,278,559 and U.S. Pat. No. 7,672,062). Still further, there is known a zoom lens that includes five lens units respectively having positive refractive power, negative refractive power, positive refractive power, negative refractive power, and positive refractive power in order from an object side to an image side (U.S. Pat. No. 7,864,443).

U.S. Pat. No. 6,278,559 discusses a high-performance zoom lens that uses a glass material having a high refractive index and comparatively a low dispersion to form a negative lens of a second lens unit so that chromatic aberration, curvature of field, and astigmatism are satisfactorily corrected throughout the entire zoom range. U.S. Pat. No. 7,672,062 and U.S. Pat. No. 7,864,443 discuss high-performance zoom lenses that use a glass material having a low refractive index and low dispersion to form a negative lens of a second lens unit so that chromatic aberration of magnification (lateral chromatic aberration) is corrected throughout the entire zoom range.

Recently, image sensors having an extremely large number of pixels have become available; and can be advantageously used in an image pickup apparatus such as a TV camera, a video camera, or a digital still camera. However, in order to optimize the benefits of such image sensors, a zoom lens which can give a high image quality is required. Thus, there is a demand for a zoom lens that has high optical performance in a variety of image pickup apparatuses. Specifically, in the positive lead type zoom lens, it is important to appropriately set the zoom type or the lens configuration of each of the lens units to thereby obtain high optical performance throughout the entire zoom range with a wide angle of view and a high zoom ratio ensured.

In general, it becomes increasingly important to satisfactorily correct various aberrations throughout the entire zoom range to thereby obtain high optical performance throughout the entire zoom range. In particular, it is important to satisfactorily correct chromatic aberration of magnification. Here, as the correction of chromatic aberration of magnification, it is important to satisfactorily correct not only the amount of chromatic aberration of magnification between the C and F lines based on the d line, but also the amount of chromatic aberration of magnification between the g and F lines at the wide-angle end area.

In the positive lead type zoom lens, it is important to appropriately set especially the lens configuration of the second lens unit used for varying magnification to satisfactorily correct chromatic aberration of magnification throughout the entire zoom range with a high zoom ratio ensured. If the lens configuration of the second lens unit used for varying magnification is not appropriately set, it is difficult to obtain a zoom lens that has high optical performance throughout the entire zoom range with a wide angle of view and a high zoom ratio ensured.

SUMMARY OF THE INVENTION

The present invention is directed to a zoom lens having a wide angle of view and a high zoom ratio and having high optical performance throughout the entire zoom range, and to an image pickup apparatus including the zoom lens.

According to an aspect of the present invention, a zoom lens includes, in order from an object side to an image side, a first lens unit having positive refractive power, a second lens unit having negative refractive power, a third lens unit having positive or negative refractive power, and a rear lens group including one or more lens units, wherein during zooming from a wide-angle end to a telephoto end, the second lens unit moves along an optical axis so that a distance between the first lens unit and the second lens unit increases, wherein an aperture stop is provided on the image side of the second lens unit, and wherein, when a sum of relative anomalous partial dispersion $\Delta\theta gF$ of materials of negative lenses included in the second lens unit is indicated by $\text{SUM}(\Delta\theta gF_{2N})$, a sum of optical power of negative lenses formed of a material having relative anomalous partial dispersion $\Delta\theta gF$ that is equal to or more than an average value of the relative anomalous partial dispersion $\Delta\theta gF$ of the materials of the negative lenses included in the second lens unit is indicated by $\phi_{2SUM}$, and an optical power of the second lens unit is indicated by $\phi_2$, the following conditions are satisfied:

$$0.065 < \text{SUM}(\Delta\theta gF_{2N}) < 0.200$$

$$0.4 < \phi_{2SUM}/\phi_2 < 2.0.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are aberration diagrams in a wide-angle end and a telephoto end, respectively, at the infinite object distance according to the first exemplary embodiment.

FIG. 3 is a cross-sectional view of a zoom lens at an infinite object distance according to a second exemplary embodiment.

FIGS. 6A and 6B are aberration diagrams in a wide-angle end and a telephoto end, respectively, at the infinite object distance according to the third exemplary embodiment.

FIGS. 8A and 8B are aberration diagrams in a wide-angle end and a telephoto end, respectively, at the infinite object distance according to the fourth exemplary embodiment.

FIGS. 10A and 10B are aberration diagrams in a wide-angle end and a telephoto end, respectively, at the infinite object distance according to the fifth exemplary embodiment.

DESCRIPTION OF THE EMBODIMENTS

Various exemplary embodiments, features, and aspects of the invention will be described in detail below with reference to the drawings.

Hereinafter, a zoom lens and an image pickup apparatus including the same according to exemplary embodiments of the invention will be described. First, the invention is directed to a zoom lens that has a wide angle of view and a high zoom ratio and obtains high optical performance throughout the entire zoom range and an image pickup apparatus including the same. Therefore, the zoom lens according to exemplary embodiments of the invention includes, in order from an object side to an image side, a first lens unit having positive refractive power, a second lens unit having negative refractive power, a third lens unit having positive or negative refractive power, and a rear lens group including one or more lens units. During zooming from a wide-angle end to a telephoto end, the second lens unit moves along the optical axis so that a distance between the first lens unit and the second lens unit increases.

Figure 1:
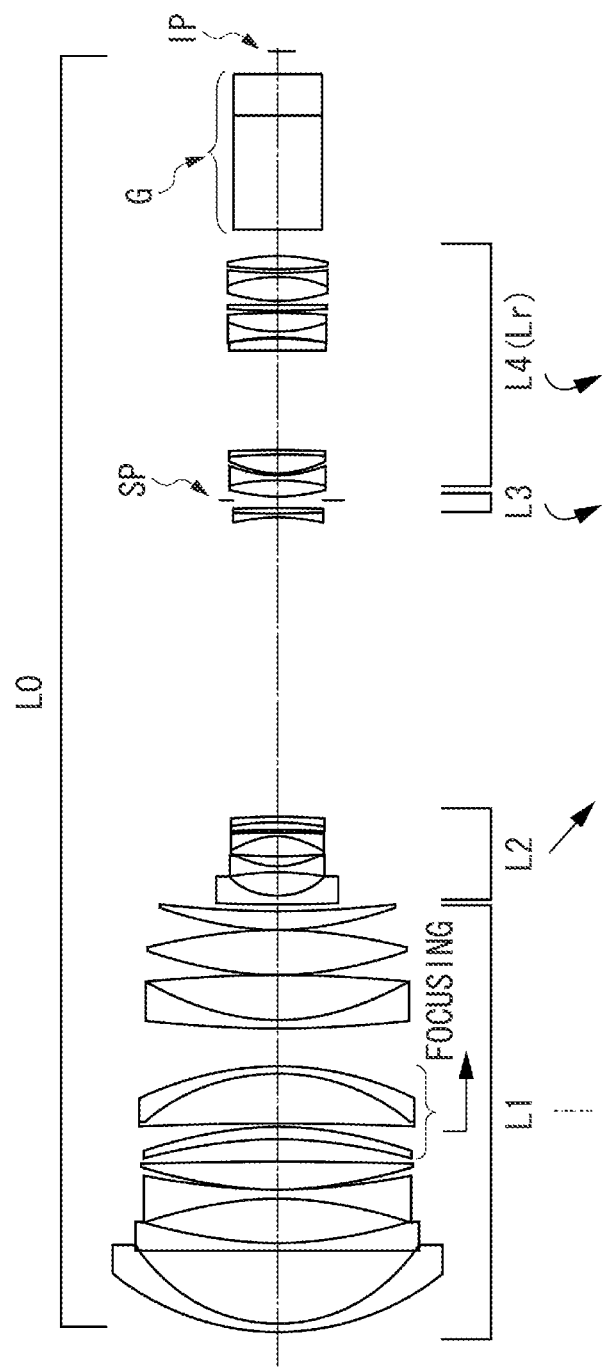
FIG. 1 is a cross-sectional view of a zoom lens at an infinite object distance according to a first exemplary embodiment.
Figure 2A:
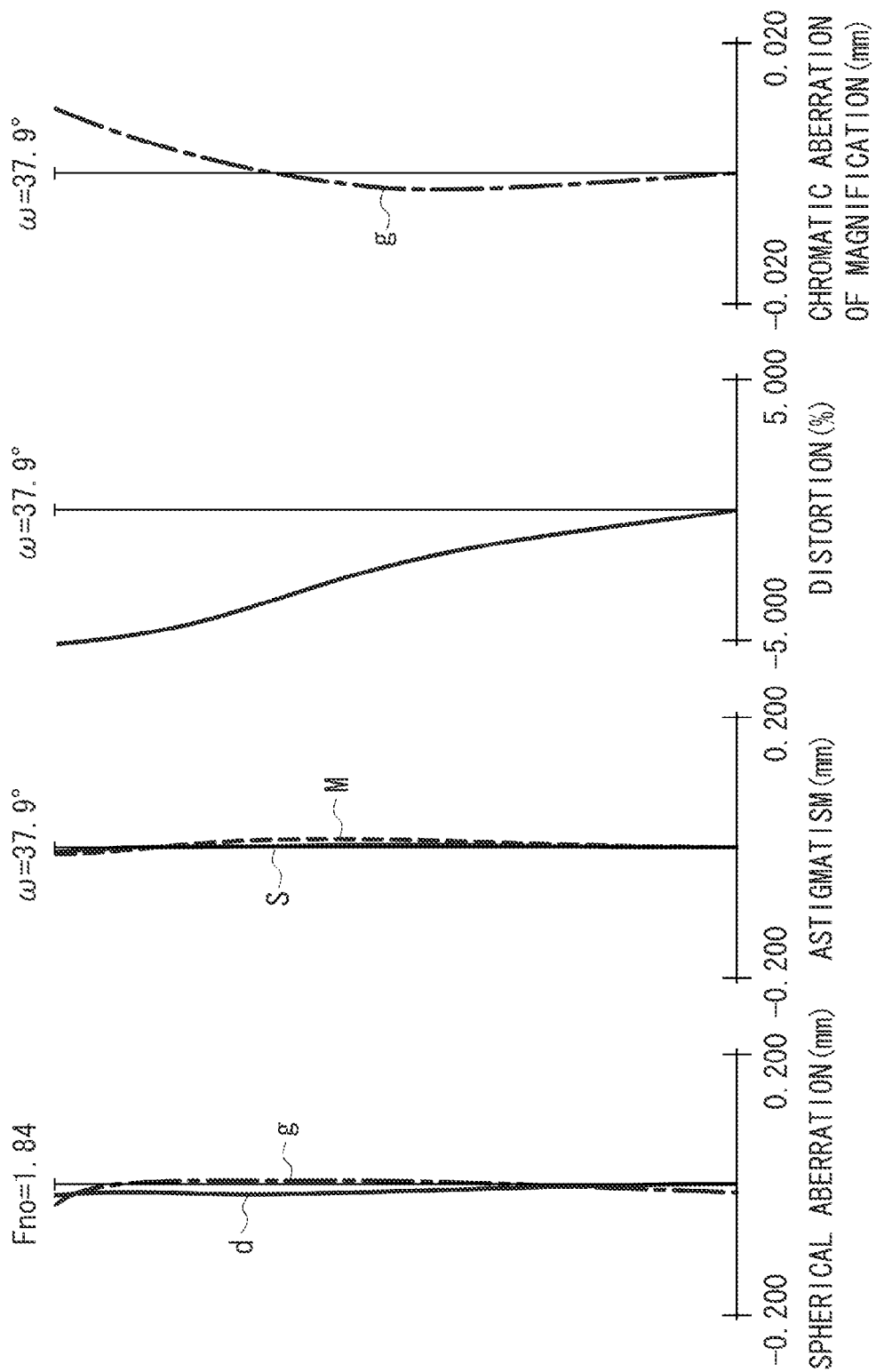
Figure 4A:
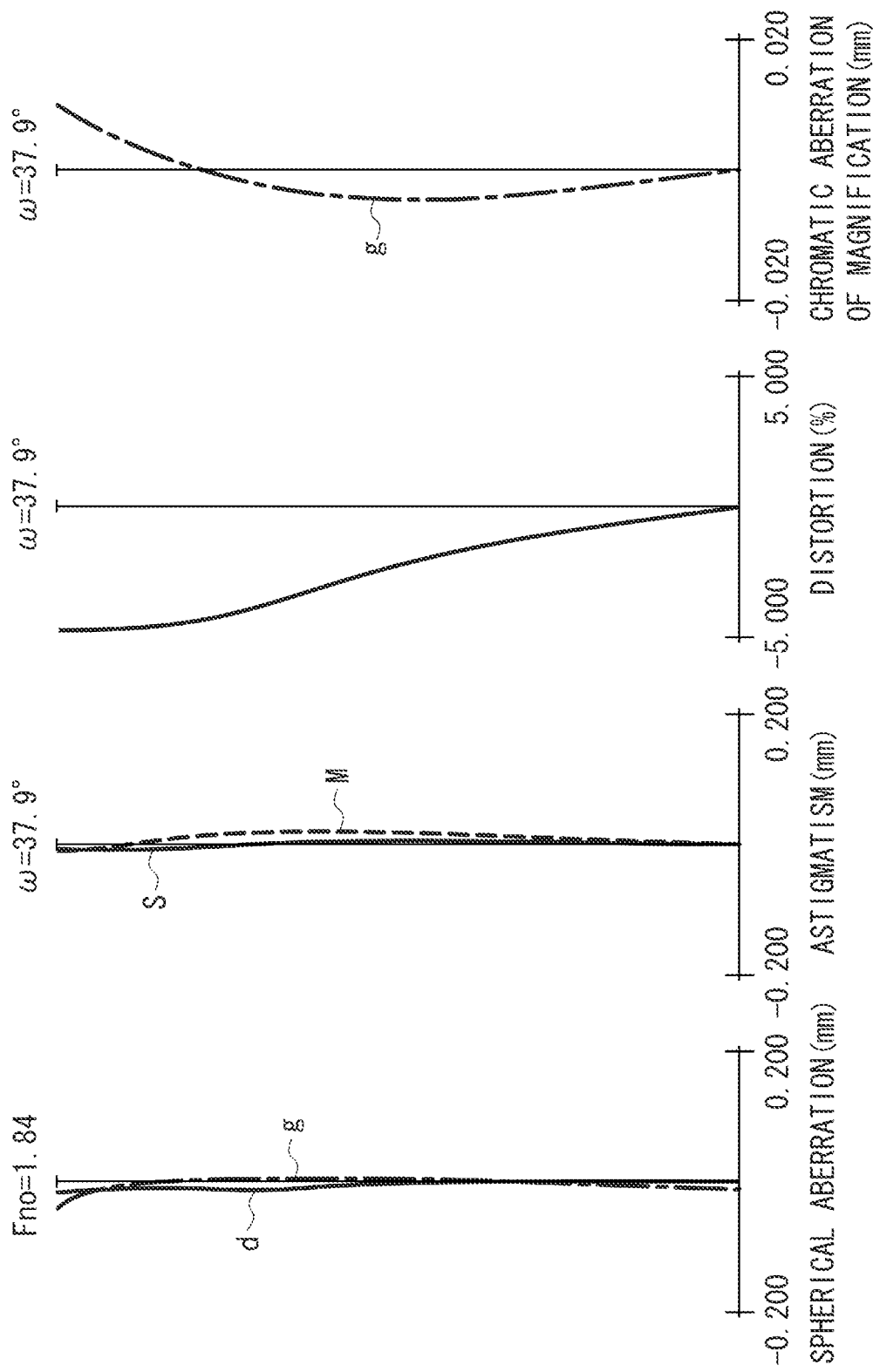
FIGS. 4A and 4B are aberration diagrams in a wide-angle end and a telephoto end, respectively, at the infinite object distance according to the second exemplary embodiment.
Figure 4B:
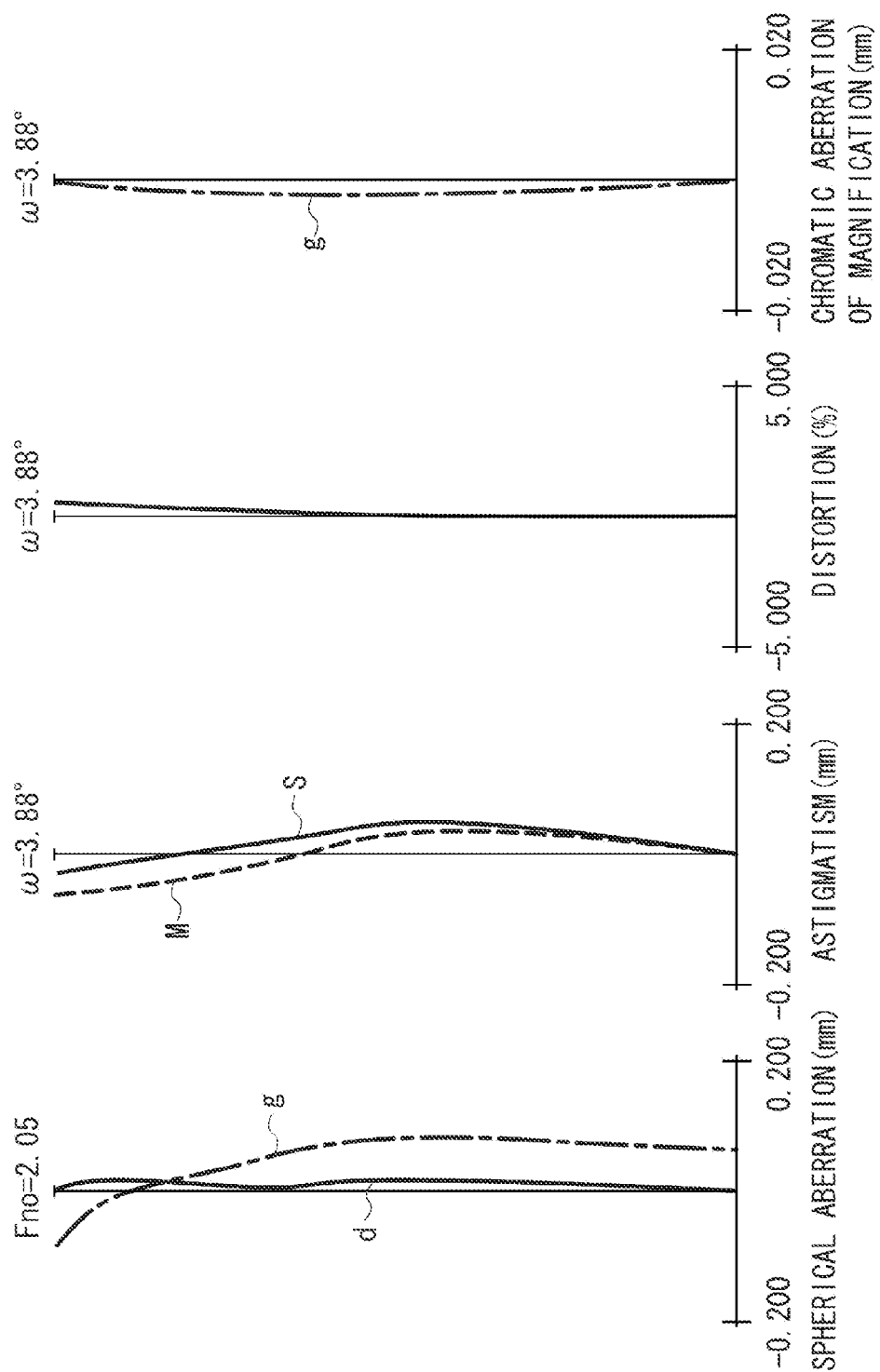
Figure 5:
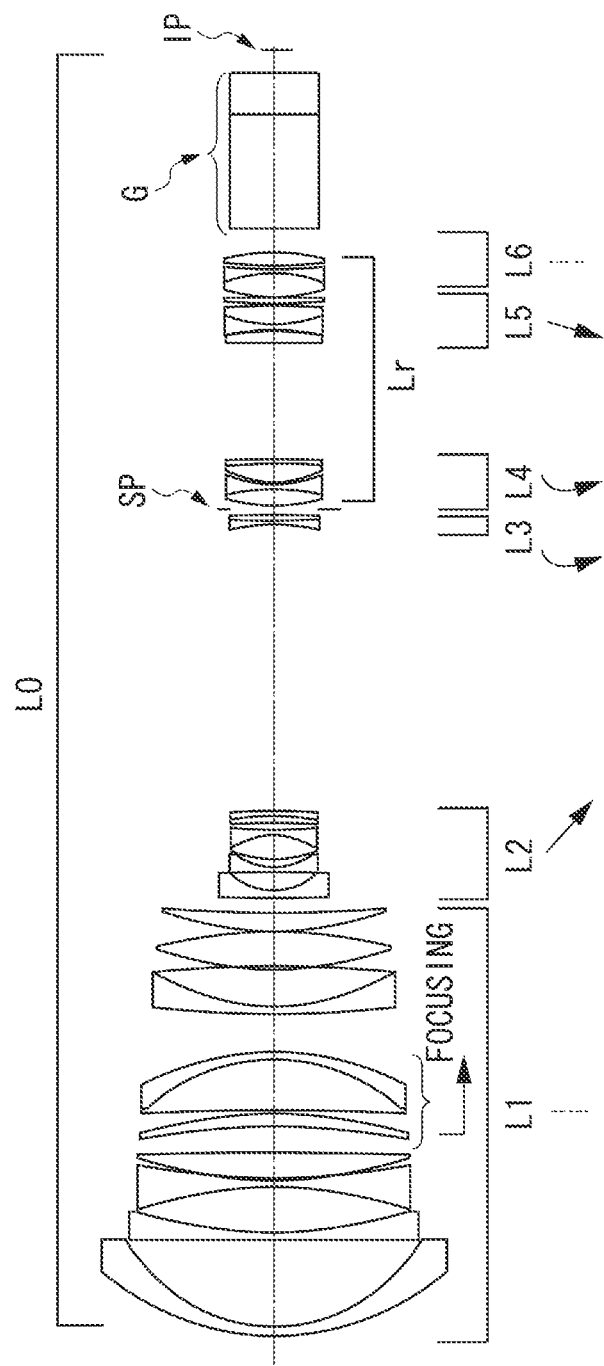
FIG. 5 is a cross-sectional view of a zoom lens at an infinite object distance according to a third exemplary embodiment.

FIG. 1 is a cross-sectional view of a lens when a zoom lens according to a first exemplary embodiment of the invention is in a wide-angle end (a short focal length end). FIGS. 2A and 2B are aberration diagrams when the zoom lens according to the first exemplary embodiment is in a wide-angle end and a telephoto end (a long focal length end), respectively. FIG. 3 is a cross-sectional view of a lens when a zoom lens according to a second exemplary embodiment of the invention is in a wide-angle end. FIGS. 4A and 4B are aberration diagrams when the zoom lens according to the second exemplary embodiment is in a wide-angle end and a telephoto end, respectively. FIG. 5 is a cross-sectional view of a lens when a zoom lens according to a third exemplary embodiment of the invention is in a wide-angle end. FIGS. 6A and 6B are aberration diagrams when the zoom lens according to the third exemplary embodiment is in a wide-angle end and a telephoto end, respectively.

Figure 7:
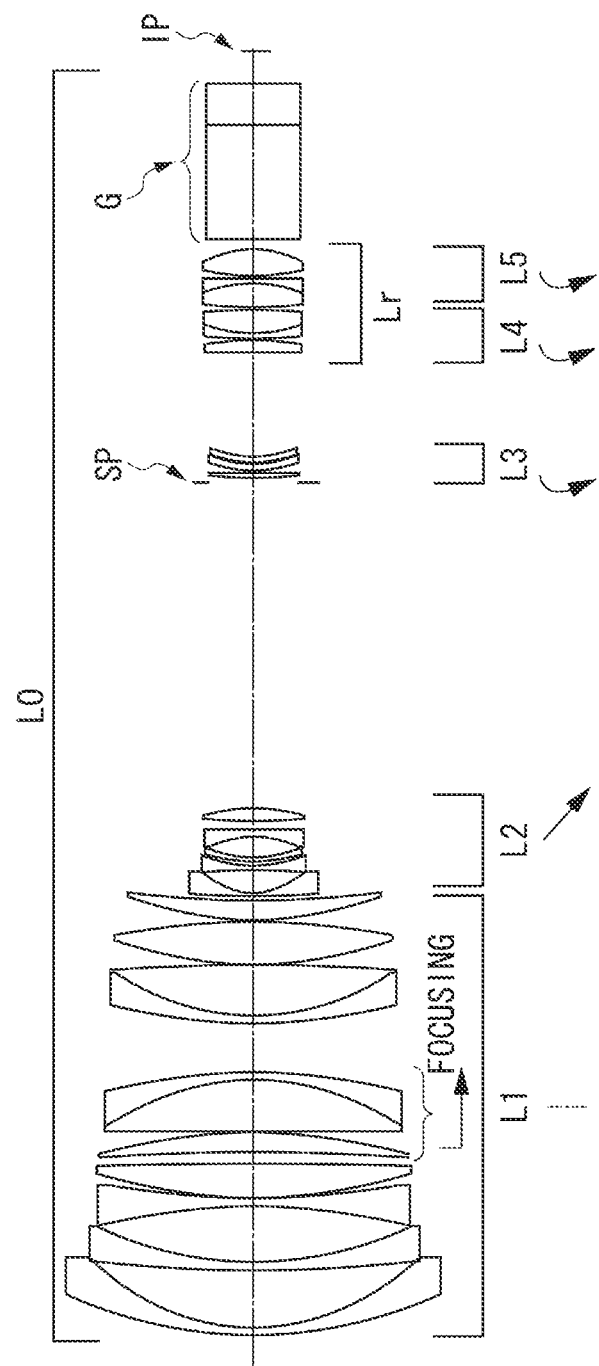
FIG. 7 is a cross-sectional view of a zoom lens at an infinite object distance according to a fourth exemplary embodiment.
Figure 8A:
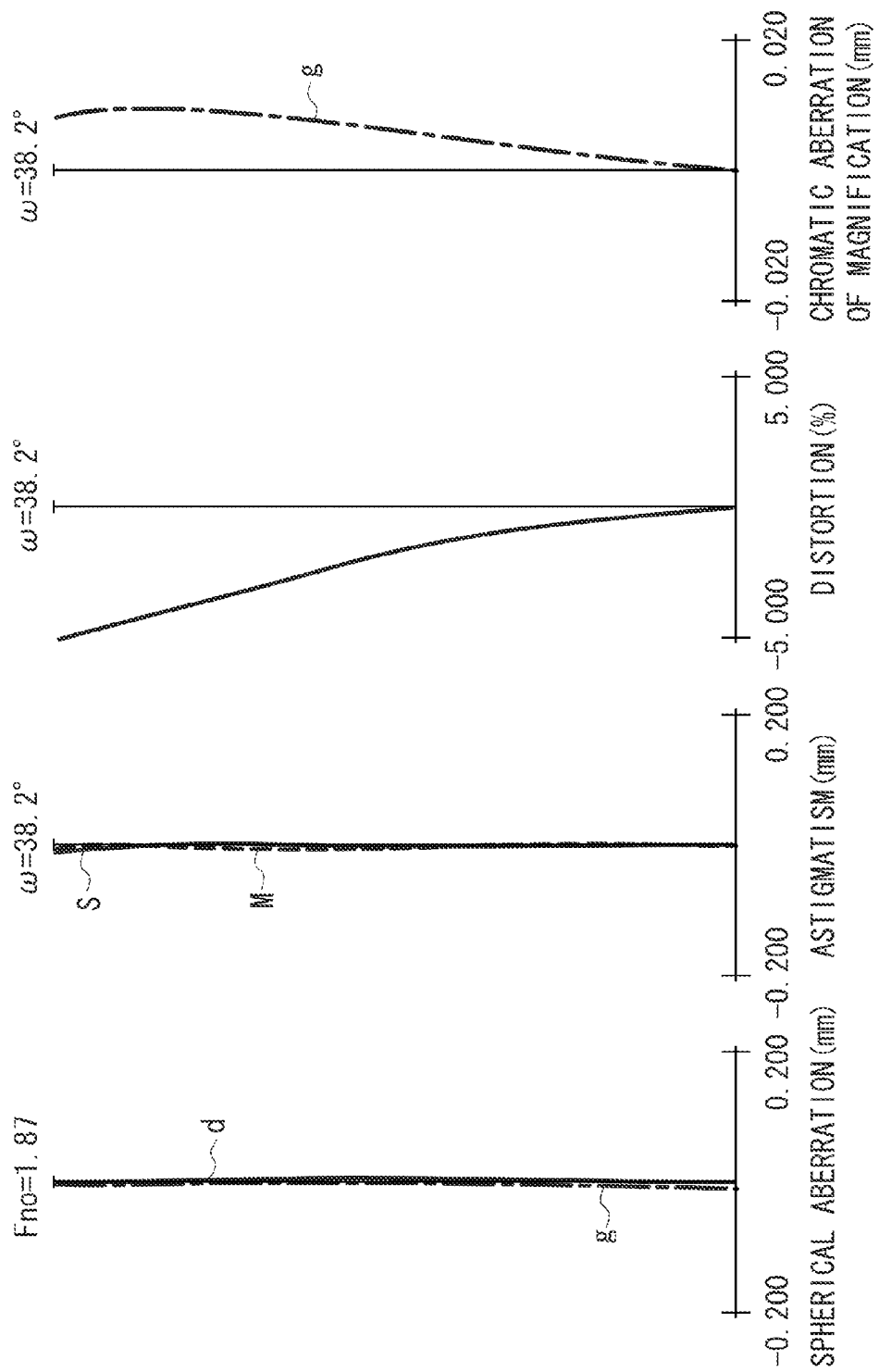
Figure 9:
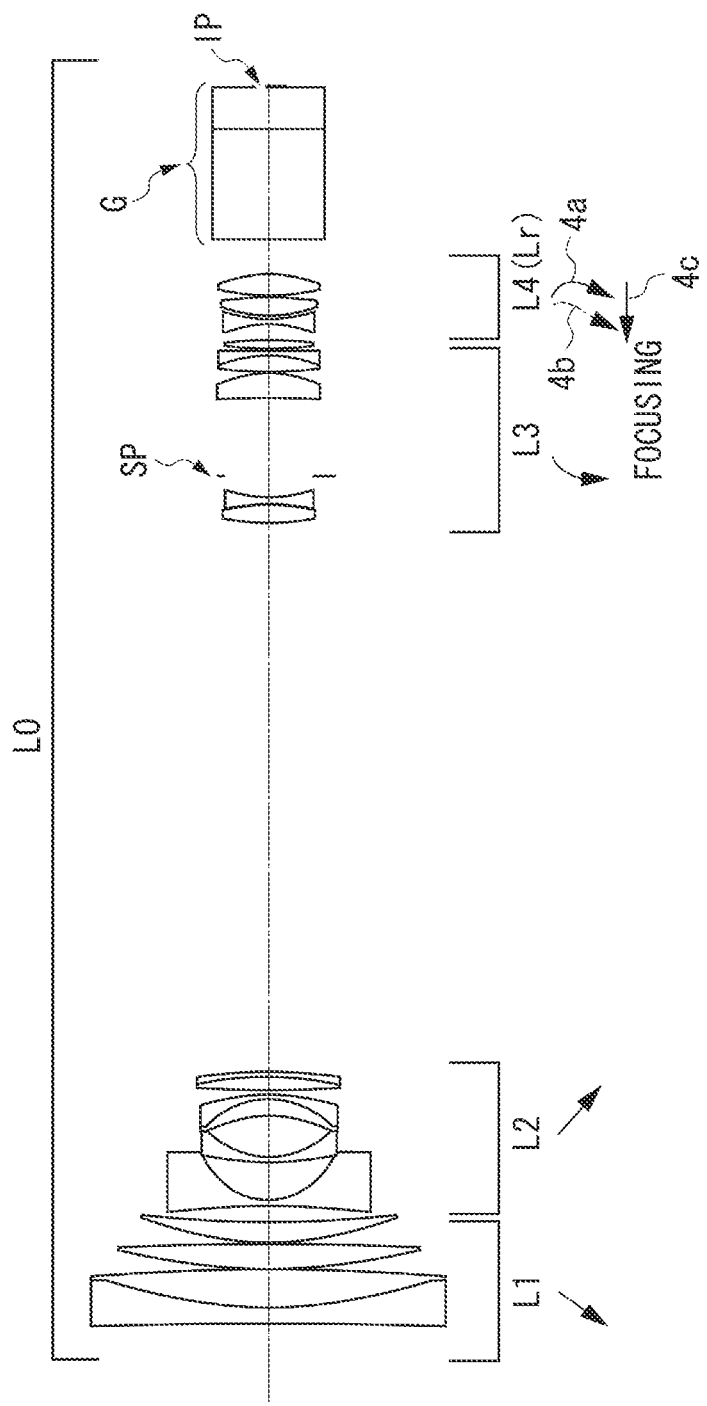
FIG. 9 is a cross-sectional view of a zoom lens at an infinite object distance according to a fifth exemplary embodiment.
Figure 11:
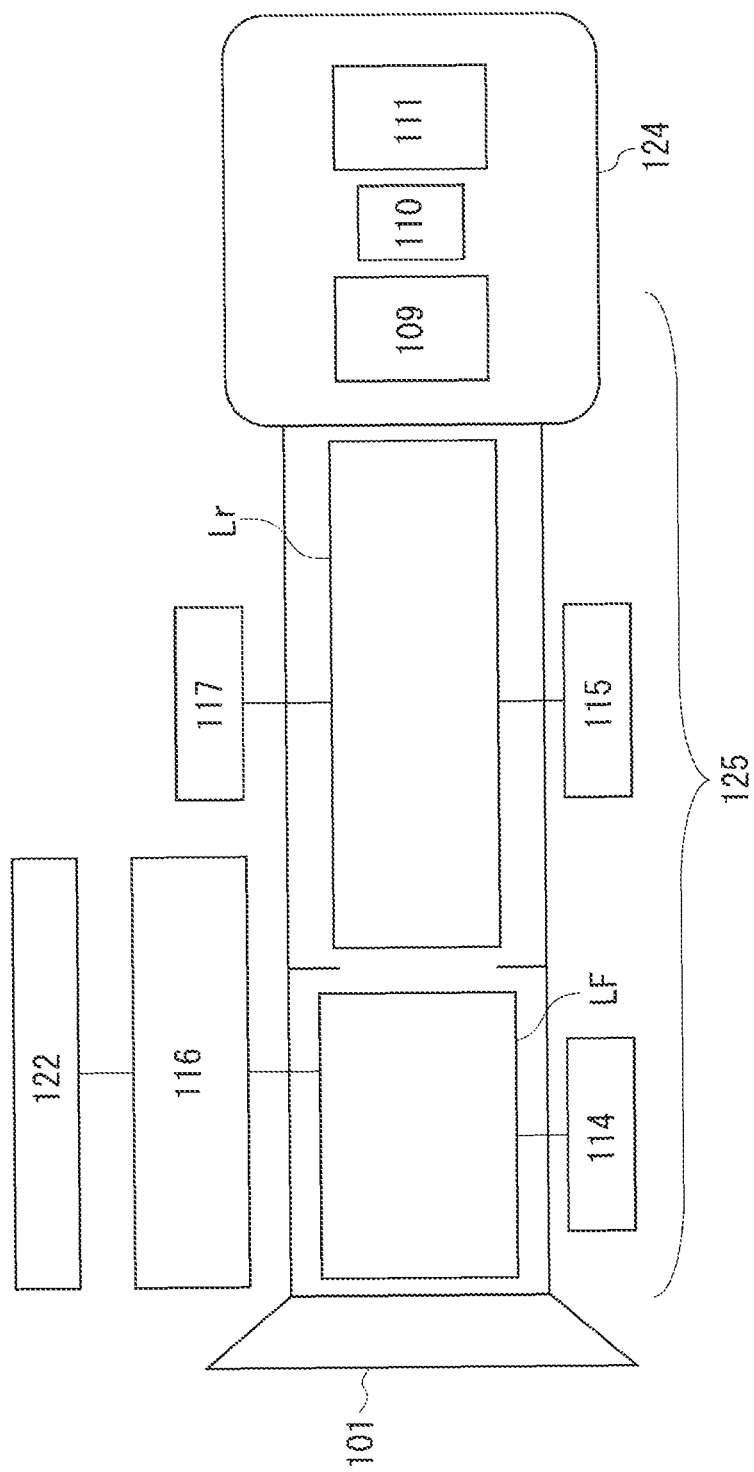
FIG. 11 is a schematic diagram of main components of an image pickup apparatus according to an exemplary embodiment of the invention.

FIG. 7 is a cross-sectional view of a lens when a zoom lens according to a fourth exemplary embodiment of the invention is in a wide-angle end. FIGS. 8A and 8B are aberration diagrams when the zoom lens according to the fourth exemplary embodiment is in a wide-angle end and a telephoto end, respectively. FIG. 9 is a cross-sectional view of a lens when a zoom lens according to a fifth exemplary embodiment of the invention is in a wide-angle end. FIGS. 10A and 10B are aberration diagrams when the zoom lens according to the fifth exemplary embodiment is in a wide-angle end and a telephoto end, respectively. FIG. 11 is a schematic diagram of main components of a TV camera (an image pickup apparatus) that includes the zoom lens according to an exemplary embodiment of the invention. The zoom lens of each of the exemplary embodiments corresponds to a photographic lens system that is used in image pickup apparatuses such as a TV camera, a video camera, a digital still camera, and a silver-halide film camera.

In the cross-sectional view of the lens, the left side indicates a subject side (an object side) (a front side) and the right side indicates an image side (a rear side). In the cross-sectional view of the lens, L0 indicates the zoom lens. Further, i indicates the order of the lens units from the object side, and Li indicates an i-th lens unit. Lr indicates a rear lens group including one or more lens units. SP indicates an aperture stop. G indicates an optical block corresponding to an optical filter, a faceplate, a crystal low-pass filter, or an infrared cutoff filter.

IP indicates an image plane, where the image plane is disposed on an imaging plane of an image sensor (a photoelectric conversion element) such as a CCD sensor or a CMOS sensor receiving an image in the case of application to a TV camera, a video camera, and a digital still camera, or is disposed on a photosensitive plane corresponding to a film surface in the case of application to a silver-halide film camera. In the cross-sectional view of the lens, the arrow indicates the locus of movement of each lens unit during zooming from the wide-angle end to the telephoto end and also indicates the movement direction during focusing from an infinitely distant object to a closest object.

In the aberration diagram, d and g respectively indicate lines d and g. M and S indicate a meridional image plane and a sagittal image plane, and chromatic aberration of magnification is indicated by the line g. Fno indicates an F-number, and ω indicates a half angle of view. In numeral examples 1 to 5 described below, the numerical values are expressed by the unit of mm, in all aberration diagrams, spherical aberration is depicted by the scale of 0.2 mm, astigmatism is depicted by the scale of 0.2 mm, distortion is depicted by the scale of 5%, and chromatic aberration of magnification is depicted by the scale of 0.02 mm. Furthermore, the wide-angle end and the telephoto end in the exemplary embodiments below indicate a zoom position when a lens unit moving to vary magnification is positioned at both ends of a movable range along the optical axis of a mechanism.

A technical characteristic of the zoom lens of each of the exemplary embodiments will be described. In the related art, as a positive lead type zoom lens, there is known a zoom lens that includes, in order from an object side to an image side, a first lens unit that has positive refractive power, a second lens unit that has negative refractive power, a third lens unit, and a rear lens group that includes one or more lens units forming an imaging thereon. In the zoom lens, the second lens unit moves along the optical axis so that a distance between the first lens unit and the second lens unit increases during zooming from the wide-angle end to the telephoto end.

In the zoom lens with such a configuration, there is a need to satisfactorily correct chromatic aberration of magnification, curvature of field, and astigmatism chiefly at the wide-angle end to obtain high image quality. In the correction of chromatic aberration of magnification, the chromatic aberration of magnification may remain between the g and F lines even when correcting chromatic aberration of magnification between the C and F lines based on the d line particularly at the wide-angle end. Accordingly, it is difficult to obtain high resolution in the entire image area and the entire zoom range.

Further, in curvature of field or astigmatism, a difference between the meridional image plane and the sagittal image plane becomes larger in an area where an image height is high particularly at the wide-angle end, and it is difficult to obtain a high resolution in the entire image area and the entire zoom range.

In many positive lead type zoom lenses of the related art, a lens configuration of a second lens unit having negative refractive power is appropriately set to solve the above-described issue. In the zoom lens discussed in U.S. Pat. No. 6,278,559, a negative lens of the second lens unit is formed of a glass material having a high refractive index to reduce curvature of field or astigmatism at the wide-angle end. Accordingly, curvature of field or astigmatism at the wide-angle end is reduced by suppressing the degradation of the Petzval sum in the entire zoom lens. Further, since chromatic aberration of magnification in the vicinity of the wide-angle end is easily degraded compared to the vicinity of the telephoto end, the negative lens of the second lens unit is formed of a glass material having a comparatively low dispersion.

Accordingly, a variation in chromatic aberration of magnification between the C and F lines is reduced. In the zoom lens discussed in U.S. Pat. No. 6,278,559, the anomalous partial dispersion characteristic of the glass material used in the lens is not discussed. When the characteristic is estimated from the refractive index and the Abbe number discussed therein, the value of the relative anomalous partial dispersion $\Delta\theta gF$ becomes a negative value, and the correction direction of chromatic aberration of magnification between the g and F lines at the wide-angle end is reversed, so that it is difficult to obtain a high image quality.

Even in the zoom lens discussed in U.S. Pat. No. 7,672,062 or U.S. Pat. No. 7,864,443, the anomalous dispersion characteristic of the glass material used in the lens is not discussed. When the characteristic is estimated from the refractive index and the Abbe number discussed therein, the negative lens of the second lens unit is formed of a glass material having a low dispersion and an anomalous partial dispersion characteristic. In this manner, chromatic aberration of magnification amount between the g and F lines is reduced as well as the correction of chromatic aberration of magnification between the C and F lines is performed at the wide-angle end. However, in the anomalous partial dispersion amount supposed to be used in U.S. Pat. No. 7,672,062 or U.S. Pat. No. 7,864,443, the correction of chromatic aberration of magnification is not certainly sufficient.

Further, when a glass material having a low refractive index is used in the negative lens in this manner, the Petzval sum is degraded. In particular, since the zoom lens discussed in U.S. Pat. No. 7,672,062 or U.S. Pat. No. 7,864,443 uses a glass material having a high refractive index in the positive lens, the Petzval sum is further degraded. In order to obtain a higher image quality of the captured image, regarding the correction of chromatic aberration of magnification, it is important to satisfactorily perform the correction of chromatic aberration of magnification between the g and F lines in addition to the correction of chromatic aberration of magnification between the C and F lines. If chromatic aberration of magnification is degraded at the telephoto end even when the correction of chromatic aberration of magnification at the area of the wide-angle end is performed, it is difficult to obtain a high image quality in the entire zoom area.

Therefore, a zoom lens according to an exemplary embodiment of the invention satisfactorily corrects chromatic aberration of magnification in the entire zoom range based on the fact that the second lens unit has a surface where the beam passage position at each zoom area changes. Specifically, an optical characteristic is used in which the off-axis chief ray passes through the periphery of the lens near the wide-angle end and the off-axis chief ray passes through the center portion of the lens near the telephoto end in the second lens unit. The negative lens of the second lens unit is formed of a glass material having a characteristic in which the relative anomalous partial dispersion $\Delta\theta gF$ becomes positive and the value thereof is comparatively large, and is used to have strong power. Accordingly, the entire second lens unit has a very large anomalous dispersion characteristic.

In an exemplary embodiment of the invention, in this manner, chromatic aberration of magnification between the C and F lines and chromatic aberration of magnification between the g and F lines at the wide-angle end area are satisfactorily corrected without largely affecting chromatic aberration of magnification at the telephoto end area.

Here, the Abbe number $\nu_d$, the relative partial dispersion $\theta gF$, and the relative anomalous partial dispersion $\Delta\theta gF$ of the material are as below. Now, it is assumed that the refractive indexes of the material with respect to the g line (435.8 nm), the F line (486.1 nm), the d line (587.6 nm), and the C line (656.3 nm) are respectively indicated by Ng, NF, Nd, and NC. At this time, the Abbe number $\nu_d$, the relative partial dispersion $\theta gF$, and the relative anomalous partial dispersion $\Delta\theta gF$ are numerical values expressed as below.

$$\nu_d = (Nd-1)/(NF-NC)$$

$$\theta gF = (Ng-NF)/(NF-NC)$$

$$\Delta\theta gF = \theta gF - (-1.61783 \times 10^{-3} \times \nu_d + 0.64146)$$

In order to effectively correct chromatic aberration of magnification through the above-described method, a glass material having a low refractive index and low dispersion is used, where the relative anomalous partial dispersion $\Delta\theta gF$ of the glass material has a comparatively large positive value. As described above, since the Petzval sum is degraded, it is difficult to reduce curvature of field and astigmatism chiefly at the wide-angle end area.

Therefore, in an exemplary embodiment of the invention, as described above, the second lens unit has a characteristic in which the off-axis chief ray passes through the periphery of the lens in the vicinity of the wide-angle end and the off-axis chief ray passes through the center portion of the lens in the vicinity of the telephoto end, and the second lens unit is provided with at least one lens surface with an aspheric shape. In this manner, when the lens surface in which the beam passage position in the lens surface at each zoom range changes is formed as an aspheric shape, curvature of field or astigmatism is corrected near the wide-angle end, and spherical aberration or coma is corrected near the telephoto end.

Next, the characteristic of the zoom lens of each of the exemplary embodiments will be described. The zoom lens L0 includes, in order from an object side to an image side, a first lens unit L1 that has positive refractive power, a second lens unit L2 that has negative refractive power, a third lens unit L3 that has positive or negative refractive power, and a rear lens group that includes one or more lens units. During zooming from the wide-angle end to the telephoto end, the second lens unit L2 moves along the optical axis so that a distance between the first lens unit L1 and the second lens unit L2 increases.

An aperture stop SP is provided on the image side of the second lens unit L2. The second lens unit L2 includes one or more lens surfaces with an aspheric shape. The total sum (sum) of relative anomalous partial dispersion $\Delta\theta gF$ of materials of negative lenses included in the second lens unit L2 is indicated by $SUM(\Delta\theta gF_{2N})$. The total sum of power of negative lenses formed of a material having relative anomalous partial dispersion $\Delta\theta gF$ that is equal to or larger than an average value of relative anomalous partial dispersion $\Delta\theta gF$ of the materials of the negative lenses included in the second lens unit L2 is indicated by $\phi_{2SUM}$. The power of the second lens unit L2 is indicated by $\phi_2$. At this time, the following conditions are satisfied:

$$0.065 < SUM(\Delta\theta gF_{2N}) < 0.200 \quad (1)$$

$$0.4 < \phi_{2SUM}/\phi_2 < 2.0 \quad (2)$$

Next, the technical significance of each of the above-described conditions will be described. The condition (1) relates to the relative anomalous partial dispersion in the material of the negative lens of the second lens unit L2. As described above, when the negative lens formed of a material in which the relative anomalous partial dispersion $\Delta\theta gF$ is positive is used in the material of the negative lens of the second lens unit L2, chromatic aberration of magnification may be easily corrected. Accordingly, in the entire second lens unit L2, the relative anomalous partial dispersion $\Delta\theta gF$ of the material of the negative lens of the second lens unit L2 has a positive value, and the other components may be appropriately adjusted.

However, when the upper limit value of the condition (1) is exceeded, in the entire system of the second lens unit L2, the anomalous dispersion characteristic of the material of the negative lens increases too much, so that chromatic aberration of magnification is excessively corrected. On the other hand, when the lower limit value of the condition (1) is exceeded, it is not desirable in that chromatic aberration of magnification remains. It is more desirable to set the condition (1) as below.

$$0.070 < SUM(\Delta\theta gF_{2N}) < 0.200 \quad (1a)$$

The condition (2) relates to the power of the negative lens of the second lens unit L2. As described above, in order to correct chromatic aberration of magnification, the negative lens formed of a material of which the relative anomalous partial dispersion $\Delta\theta gF$ is positive may be used. At this time, when the negative lens does not have a comparatively strong power, it is difficult to highly effectively correct chromatic aberration of magnification. However, when the negative lens has too much power, the curvature of the lens surface becomes larger, and curvature of field or coma other than chromatic aberration frequently occurs.

Therefore, in an exemplary embodiment of the invention, power appropriate for the negative lens is given. When the upper limit value of the condition (2) is exceeded, the power of the negative lens formed of a material equal to or more than the average value of the relative anomalous partial dispersion $\Delta\theta gF$ in the second lens unit L2 increases too much, and chromatic aberration of magnification is excessively corrected. Further, the power exceeding the upper limit is not desirable for the reason that the balance with curvature of field or coma cannot be achieved. On the other hand, when the lower limit value of the condition (2) is exceeded, it is not desirable in that chromatic aberration of magnification is insufficiently corrected. It is more desirable to set the condition (2) as below.

$$0.45 < \phi_{2SUM}/\phi_2 < 1.7 \quad (2a)$$

It is more desirable to set the condition (2a) as below.

$$0.45 < \phi_{2SUM}/\phi_2 < 1.5 \quad (2b)$$

According to the exemplary embodiments as above, it is possible to provide the zoom lens which gives a high image quality through the entire display while satisfactorily correcting chromatic aberration of magnification through the entire zoom range.

In the exemplary embodiments, it is more desirable to satisfy at least one of conditions described below, so that a higher optical performance may be easily obtained. The Abbe number of a material of at least one negative lens included in the second lens unit L2 is indicated by $v_{2N}$. The total sum of relative anomalous partial dispersion $\Delta\theta gF$ of materials of positive lenses included in the first lens unit L1 is indicated by $SUM(\Delta\theta gF_{1P})$. The focal length of the first lens unit L1 is indicated by $f_1$, the focal length of the second lens unit L2 is indicated by $f_2$, the focal length of the third lens unit L3 is indicated by $f_3$, the focal length of the entire zoom lens at the wide-angle end is indicated by $f_w$, and the focal length of the entire zoom lens at the telephoto end is indicated by $f_t$.

The relative anomalous partial dispersion of a material of at least one positive lens in the positive lenses included in the second lens unit L2 is indicated by $\Delta\theta gF_{2P}$, and the refractive index of a material of at least one positive lens in the positive lenses included in the second lens unit L2 is indicated by $N_{2P}$. At this time, it is desirable to satisfy one or more of the conditions below.

$$70 < v_{2N} < 100 \quad (3)$$

$$0.030 < SUM(\Delta\theta gF_{1P}) < 0.300 \quad (4)$$

$$2.0 < f_1/\sqrt{(f_w \times f_t)} < 10.0 \quad (5)$$

$$-1.5 < f_2/\sqrt{(f_w \times f_t)} < -0.5 \quad (6)$$

$$-10.0 < f_1/f_2 < -1.0 \quad (7)$$

$$0.05 < |f_2/f_3| < 0.60 \quad (8)$$

$$-0.050 < \Delta\theta gF_{2P} < 0.017 \quad (9)$$

$$1.40 < N_{2P} < 1.70 \quad (10)$$

Next, the technical significance of each of the above-described conditions will be described. The condition (3) relates to the Abbe number of the material of at least one negative lens included in the second lens unit L2. That is, it is desirable to have one or more negative lenses satisfying the condition (3). When the upper limit value of the condition (3) is exceeded, the material of the negative lens included in the second lens unit L2 has an excessively low dispersion. For this reason, in order to actively correct chromatic aberration, the negative lens needs to have strong power. Then, the curvature radius of the lens surface becomes smaller, so that it is difficult to correct curvature of field.

On the other hand, when the lower limit value of the condition (3) is exceeded, since there is a glass material having a comparatively high refractive index, aberration such as curvature of field other than chromatic aberration may be easily corrected. However, since the glass material in this area generally has an insufficient anomalous dispersion characteristic, it is difficult to satisfactorily correct chromatic aberration of magnification between the C and F lines and chromatic aberration of magnification between the g and F lines. It is more desirable to set the condition (3) as below.

$$75<\upsilon_{2N}<98 \tag{3a}$$

The condition (4) relates to the anomalous dispersion characteristic of the material in the positive lens included in the first lens unit L1. In the condition (1) of the exemplary embodiments, the negative lens of the second lens unit L2 is formed of a material of which the relative anomalous partial dispersion ΔθgF is positive and the value thereof is comparatively large, whereby chromatic aberration of magnification near the wide-angle end is corrected. However, in this case, chromatic aberration of magnification between the g and F lines near the telephoto end contrary to the correction of chromatic aberration of magnification near the wide-angle end may remain.

Therefore, in order to correct chromatic aberration of magnification remaining near the telephoto end, the lens configuration of the first lens unit L1 in which the off-axis chief ray passes through the periphery of the lens near the telephoto end is appropriately set. It is desirable to correct chromatic aberration of magnification between the g and F lines near the telephoto end by using a material of which the value of the relative anomalous partial dispersion ΔθgF is positive and the value is comparatively large as the material of the positive lens of the first lens unit L1. However, when the upper limit value of the condition (4) is exceeded, it is not desirable in that chromatic aberration of magnification between the g and F lines near the telephoto end is excessively corrected.

On the other hand, when the lower limit value of the condition (4) is exceeded, it is not desirable in that chromatic aberration of magnification between the g and F lines near the telephoto end is insufficiently corrected and axial chromatic aberration between the g and F lines near the telephoto end is insufficiently corrected. It is more desirable to set the condition (4) as below.

$$0.035<\text{SUM}(\Delta\theta gF_{1P})<0.300 \tag{4a}$$

The condition (5) relates to the focal length of the first lens unit L1. When the upper limit value of the condition (5) is exceeded, the focal length of the first lens unit L1 becomes much longer than the focal length of the entire zoom lens. Then, the entire length becomes longer, so that the entire zoom lens increases in size. On the other hand, when the lower limit value of the condition (5) is exceeded, the focal length of the first lens unit L1 becomes much shorter than the focal length of the entire zoom lens. Then, it is difficult to satisfactorily correct coma and curvature of field in both the wide-angle end area and the telephoto end area. It is more desirable to set the condition (5) as below.

$$2.5<f_1/\sqrt{(f_w\times f_t)}<8.0 \tag{5a}$$

The condition (6) relates to the focal length of the second lens unit L2. When the upper limit value of the condition (6) is exceeded, the power of the second lens unit L2 becomes stronger, and it is difficult to satisfactorily correct curvature of field in the entire zoom range. On the other hand, when the lower limit value of the condition (6) is exceeded, the power of the second lens unit L2 becomes weaker, the movement amount of the second lens unit L2 during zooming increases, and the entire zoom lens increases in size. It is more desirable to set the condition (6) as below.

$$-1.3<f_2/\sqrt{(f_w\times f_t)}<-0.9 \tag{6a}$$

The condition (7) relates to a ratio between the focal lengths of the first lens unit L1 and the second lens unit L2. When the upper limit value or the lower limit value of the condition (7) is exceeded, it is difficult to satisfactorily correct chromatic aberration, coma, and curvature of field in both the wide-angle end area and the telephoto end area. It is more desirable to set the condition (7) as below.

$$-7.0<f_1/f_2<-2.0 \tag{7a}$$

The condition (8) relates to a ratio between the focal lengths of the second lens unit L2 and the third lens unit L3. When the upper limit value or the lower limit value of the condition (8) is exceeded, it is difficult to correct curvature of field chiefly at the wide-angle end. It is more desirable to set the condition (8) as below.

$$0.07<|f_2/f_3|<0.45 \tag{8a}$$

It is more desirable to set the condition (8a) as below.

$$0.10<|f_2/f_3|<0.40 \tag{8b}$$

The condition (9) relates to the relative anomalous partial dispersion of the material of the positive lens included in the second lens unit L2. When the upper limit value of the condition (9) is exceeded, chromatic aberration of magnification between the g and F lines chiefly at the wide-angle end still exists. On the other hand, when the lower limit value of the condition (9) is exceeded, chromatic aberration of magnification between the g and F lines chiefly at the wide-angle end is excessively corrected. It is more desirable to set the condition (9) as below.

$$-0.050<\Delta\theta gF_{2P}<0.010 \tag{9a}$$

The condition (10) relates to the refractive index of the material of the positive lens included in the second lens unit L2. When the upper limit value of the condition (10) is exceeded, the Petzval sum is degraded, and it is difficult to reduce curvature of field chiefly at the wide-angle end. On the other hand, when the lower limit value of the condition (10) is exceeded, the refractive index becomes smaller, and the curvature radius of the lens surface needs to be made smaller to maintain the power. Then, it is not desirable in that correction of aberration such as coma at the reference wavelength is difficult. It is more desirable to set the condition (10) as below.

$$1.45<N_{2P}<1.67 \tag{10a}$$

Hereinafter, a desirable configuration other than the configuration described in the exemplary embodiments will be described. The rear lens group Lr includes a fourth lens unit having positive refractive power on the most object side. During zooming, it is desirable that at least the second lens unit L2, the third lens unit L3, and the fourth lens unit L4 move along the optical axis. In particular, during zooming from the wide-angle end to the telephoto end, it is desirable that the second lens unit L2 monotonously move towards the image side, the third lens unit L3 move so that a distance between the third lens unit L3 and the second lens unit L2 changes, and the fourth lens unit L4 move so that a distance between the fourth lens unit L4 and the third lens unit L3 changes.

In particular, during zooming from the wide-angle end to the telephoto end, it is desirable that the second lens unit L2 monotonously move towards the image side. Then, it is desirable that the third lens unit L3 move towards the object side along a locus of a convex shape so that a distance between the third lens unit L3 and the second lens unit L2 changes, and the fourth lens unit L4 move so that a distance between the fourth lens unit L4 and the third lens unit L3 changes. In this manner, curvature of field may be satisfactorily corrected throughout the entire zoom range by moving each of the lens units.

Then, in the second lens unit L2, it is desirable to locate the negative lens with a concave surface facing the image side and the negative lens with a concave surface facing the image side in order from the object side to the image side. Then, the image side is provided with two or more negative lenses and one or more positive lenses in no particular order.

In this manner, curvature of field is corrected while correcting chromatic aberration of magnification using first two negative lenses. Then, when at least two negative lenses are disposed in the image side, the power of the negative lens inside the second lens unit L2 is dispersed, so that the curvature of the lens surface is prevented from becoming larger due to the low refractive index of the material of the negative lens. Further, when at least one positive lens is disposed, curvature of field or coma occurring in the negative lens is corrected.

Specifically, it is desirable that the second lens unit include, in order from the object side to the image side, a negative lens that has a concave surface facing the image side, a negative lens that has a concave surface facing the image side, a cemented lens that is obtained by cementing a positive lens and a negative lens, and a cemented lens that is obtained by cementing a positive lens and a negative lens. Alternatively, it is desirable that the second lens unit include, in order from the object side to the image side, a negative lens that has a concave surface facing the image side, a negative lens that has a concave surface facing the image side, a negative lens, a negative lens, and a positive lens. As described above, according to the exemplary embodiments, a zoom lens is obtained which corrects chromatic aberration throughout the entire display and has high optical performance.

Next, the characteristics of the lens configurations of the exemplary embodiments will be described. The lenses indicated by the reference numerals respectively correspond to the above-described lenses indicated by the reference numerals. The zoom lens L0 of the first exemplary embodiment in FIG. 1 includes, in order from the object side to the image side, the first lens unit L1 that has positive refractive power, the second lens unit L2 that has negative refractive power, the third lens unit L3 that has negative refractive power, and the rear lens group Lr. The rear lens group Lr includes the fourth lens unit L4 that has positive refractive power. During zooming from the wide-angle end to the telephoto end, the second lens unit L2, the third lens unit L3, and the fourth lens unit L4 independently move.

Specifically, the second lens unit L2 moves towards the image side along the optical axis, and the third lens unit L3 and the fourth lens unit L4 move along a locus in which they move once towards the object side and return towards the image side and which has a convex shape towards the object side. The aperture stop SP is provided between the third lens unit L3 and the fourth lens unit L4, and moves together with the fourth lens unit L4 during zooming. The object side lens surface of the most object side negative lens of the second lens unit L2, the object side lens surface of the second negative lens, the object side lens surface of the second positive lens, and the object side lens surface of the most object side lens of the fourth lens unit L4 have an aspheric shape.

Focusing, from an infinitely distant object to a closest object, is performed by moving a partial group L1F (the fifth lens to the seventh lens from the most object side) of the first lens unit L1 towards the image side.

The zoom lens L0 of the second exemplary embodiment in FIG. 3 includes the first lens unit L1 that has positive refractive power, the second lens unit L2 that has negative refractive power, and the third lens unit L3 that has negative refractive power. As the rear lens group Lr, the image side of the third lens unit L3 is provided with the fourth lens unit L4 that has positive refractive power, the fifth lens unit L5 that has positive refractive power, and the sixth lens unit L6 that has positive refractive power.

The second exemplary embodiment is directed to the six-unit zoom lens that includes six lens units. During zooming from the wide-angle end to the telephoto end, the second lens unit L2 to the sixth lens unit L6 independently move. Specifically, the second lens unit L2 moves towards the image side along the optical axis, and the third lens unit L3 and the fourth lens unit L4 move along a locus in which they move once towards the object side and return towards the image side and which has a convex shape towards the object side. Further, the fifth lens unit L5 moves towards the object side so that a distance between the respective lens units changes. The sixth lens unit L6 moves along a locus which is convex towards the object side.

The aperture stop SP is provided between the third lens unit L3 and the fourth lens unit L4, and moves together with the fourth lens unit L4 during zooming. The object side lens surface of the most object side negative lens of the second lens unit L2, the object side lens surface of the second negative lens, the object side lens surface of the second positive lens, and the object side lens surface of the most object side lens of the fourth lens unit L4 have an aspheric shape. Focusing from an infinitely distant object to a closest object is performed by moving a partial group (the fifth lens to the seventh lens from the most object side) of the first lens unit L1 towards the image side.

The zoom lens L0 of the third exemplary embodiment in FIG. 5 includes the first lens unit L1 that has positive refractive power, the second lens unit L2 that has negative refractive power, and the third lens unit L3 that has negative refractive power. As the rear lens group Lr, the image side of the third lens unit L3 is provided with the fourth lens unit L4 that has positive refractive power, the fifth lens unit L5 that has positive refractive power, and the sixth lens unit L6 that has positive refractive power. The third exemplary embodiment is directed to the six-unit zoom lens that includes six lens units. During zooming from the wide-angle end to the telephoto end, the second lens unit L2 to the fifth lens unit L5 independently move.

Specifically, the second lens unit L2 moves towards the image side along the optical axis, and the third lens unit L3 and the fourth lens unit L4 move along a locus in which they move once towards the object side and return towards the image side and which has a convex shape towards the object side. Further, the fifth lens unit L5 moves towards the object side. The aperture stop SP is provided between the third lens unit L3 and the fourth lens unit L4, and moves together with the fourth lens unit L4 during zooming.

The object side lens surface of the most object side negative lens of the second lens unit L2, the object side lens surface of the second negative lens, the object side lens surface of the second positive lens, and the object side lens surface of the most object side lens of the fourth lens unit L4 have an aspheric shape. Focusing from an infinitely distant object to a closest object is performed by moving a partial group (the fifth lens to the seventh lens from the most object side) of the first lens unit L1 towards the image side.

The zoom lens L0 of the fourth exemplary embodiment in FIG. 7 includes the first lens unit L1 that has positive refractive power, the second lens unit L2 that has negative refractive power, and the third lens unit L3 that has positive refractive power. As the rear lens group Lr, the image side of the third lens unit L3 is provided with the fourth lens unit L4 that has positive refractive power and the fifth lens unit L5 that has positive refractive power. During zooming from the wide-angle end to the telephoto end, the second lens unit L2 to the fifth lens unit L5 independently move. Specifically, the second lens unit L2 moves towards the image side along the optical axis, and the third lens unit L3 moves along a locus in which it moves once towards the object side and returns towards the image side and which has a convex shape towards the object side.

Further, the fourth lens unit L4 and the fifth lens unit L5 move along a locus which has a convex shape towards the object side so that a distance between the respective lens units changes. The aperture stop SP is provided between the second lens unit L2 and the third lens unit L3, and moves together with the third lens unit L3 during zooming. The object side lens surface of the most object side negative lens of the second lens unit L2, the object side lens surface of the most object side lens of the third lens unit L3, and the image side lens surface of the second lens of the fifth lens unit L5 from the object side have an aspheric shape.

Focusing from an infinitely distant object to a closest object is performed by moving a partial group (the fifth lens to the seventh lens from the most object side) of the first lens unit L1 towards the image side.

The zoom lens L0 of the fifth exemplary embodiment in FIG. 9 includes the first lens unit L1 that has positive refractive power, the second lens unit L2 that has negative refractive power, the third lens unit L3 that has positive refractive power, and the rear lens group Lr. The rear lens group Lr includes the fourth lens unit L4 that has positive refractive power. During zooming from the wide-angle end to the telephoto end, the first lens unit L1 to the fourth lens unit L4 independently move. Specifically, the first lens unit L1 moves towards the object side along the optical axis.

The second lens unit L2 moves towards the image side along the optical axis, and the third lens unit L3 moves along a locus which has a convex shape towards the object side. Then, the fourth lens unit L4 moves towards the image side between the wide-angle end and the middle zoom position, and moves towards the object side between the middle zoom position and the telephoto end. That is, the fourth lens unit L4 moves along a locus which has a convex shape towards the image side. The aperture stop SP is provided inside the third lens unit L3, and moves together with the third lens unit L3 during zooming.

The object side lens surface of the most object side negative lens of the second lens unit L2, the image side lens surface of the second negative lens, and the object side lens surface of the second positive lens (the fifth lens from the object side) from the object side have an aspheric shape. Further, the object side lens surface of the most object side lens of the third lens unit L3 and the image side lens surface of the most image side lens of the fourth lens unit L4 have an aspheric shape. Focusing from an infinitely distant object to a closest object is performed by a rear focus type that moves the fourth lens unit L4 towards the object side.

A solid curve 4a and a dotted curve 4b of the fourth lens unit L4 respectively indicate the movement loci used for correcting a variation of the image plane due to variation of magnification during focusing on an infinitely distant object and a closest object. During focusing from an infinitely distant object to a closest object at the telephoto end, the fourth lens unit L4 is moved forward (towards the object side) as depicted by the arrow 4c in FIG. 9.

While the exemplary embodiments of the invention have been described, the invention is not limited to the exemplary embodiments. The position of the lens having a focusing function or an optical image stabilizing function may be modified and changed in various forms within the scope and spirit of the present application. In this manner, when the optical systems according to the first to fifth exemplary embodiments are applied to a broadcasting television camera, a video camera, and a still camera, a zoom lens having high optical performance may be realized.

Hereinafter, numerical examples 1 to 5 corresponding to the first to fifth exemplary embodiments of the invention are shown. In the numerical examples, i (where i=1, 2, 3 . . . ) indicates the order of the surface from the object side, $r_i$ indicates the radius of curvature of the i-th surface from the object side, $d_i$ indicates a distance between the i-th surface and the i+1-th surface from the object side, and $nd_i$ and $\upsilon d_i$ respectively indicate the refractive index and the Abbe number of the i-th optical member. θgF indicates the relative partial dispersion, and ΔθgF indicates the relative anomalous partial dispersion. f, Fno, and 2ω respectively indicate the focal length of the entire zoom lens, the F-number thereof, and the angle of view (degree) thereof during focusing on an infinitely distant object. When the direction of the optical axis indicates the X axis, the direction perpendicular to the optical axis indicates the H axis, the beam advancing direction indicates the positive direction, R indicates the paraxial radius of curvature, k indicates the eccentricity, and A4, A6, A8, A10, and A12 respectively indicate aspheric coefficients. The aspheric shape of a given surface, as expressed in terms of X, can be represented by the following expression.

$$X = \frac{\left(\frac{H^2}{R}\right)}{\left\{1 + \sqrt{1 - (1+k) \cdot \left(\frac{H}{R}\right)^2}\right\}} + A4 \cdot H^4 + A6 \cdot H^6 + A8 \cdot H^8 + A10 \cdot H^{10} + A12 \cdot H^{12}$$

Further, in the values of the aspheric coefficients, the scientific notation "e-Z" is equivalent to the exponential notation "$10^{-Z}$". With the foregoing parameters defined, the relation between each of the above-described conditions and various numerical values of the numerical examples is shown in Table-1. The back focus indicates a distance from the most image side surface of the glass block to the focal plane.

Numerical Example 1

| | f = 10.26 to 117.82 mm | | | | | | |
| | Fno = 1.84 to 1.97 | | | | | | |
| | 2ω = 75.9 to 7.76 | | | | | | |

| surface number | r | d | nd | $\nu_d$ | effective diameter | θgF | ΔθgF |
|---|---|---|---|---|---|---|---|
| 1 | 114.675 | 3.80 | 1.73400 | 51.5 | 140.31 | 0.54839 | −0.00980 |
| 2 | 73.792 | 31.92 | | | 121.50 | | |
| 3 | 2095.870 | 3.30 | 1.69680 | 55.5 | 120.65 | 0.54343 | −0.00821 |
| 4 | 192.718 | 20.29 | | | 114.50 | | |
| 5 | −159.094 | 3.20 | 1.65160 | 58.5 | 113.98 | 0.54178 | −0.00497 |
| 6 | 261.732 | 0.20 | | | 114.39 | | |
| 7 | 184.195 | 12.68 | 1.80518 | 25.4 | 115.46 | 0.61655 | 0.01623 |
| 8 | −1163.336 | 9.60 | | | 115.23 | | |
| 9 | −212.650 | 5.54 | 1.49700 | 81.5 | 114.30 | 0.53859 | 0.02916 |
| 10 | −163.012 | 1.90 | | | 114.29 | | |
| 11 | −784.594 | 21.13 | 1.49700 | 81.5 | 110.44 | 0.53859 | 0.02916 |
| 12 | −92.044 | 3.60 | 1.73800 | 32.3 | 111.40 | 0.59029 | 0.00104 |
| 13 | −137.298 | 16.53 | | | 115.16 | | |
| 14 | 628.667 | 3.80 | 1.72342 | 38.0 | 115.45 | 0.58342 | 0.00336 |
| 15 | 108.126 | 19.92 | 1.49700 | 81.5 | 114.20 | 0.53859 | 0.02916 |
| 16 | −563.173 | 0.20 | | | 114.27 | | |
| 17 | 167.640 | 19.59 | 1.43387 | 95.1 | 115.04 | 0.53728 | 0.04975 |
| 18 | −191.011 | 0.20 | | | 114.94 | | |
| 19 | 144.520 | 7.71 | 1.59282 | 68.6 | 104.20 | 0.54461 | 0.01428 |
| 20 | 384.506 | (variable) | | | 103.25 | | |
| 21 (aspheric surface) | −228.745 | 3.00 | 1.43875 | 94.9 | 52.12 | 0.53463 | 0.04681 |
| 22 | 31.010 | 10.97 | | | 41.19 | | |
| 23 (aspheric surface) | 40992.744 | 2.00 | 1.43875 | 94.9 | 40.74 | 0.53463 | 0.04681 |
| 24 | 40.333 | 4.44 | | | 39.35 | | |
| 25 | 143.131 | 8.84 | 1.63980 | 34.5 | 39.55 | 0.59213 | 0.00644 |
| 26 | −35.405 | 2.00 | 1.59282 | 68.6 | 39.65 | 0.54461 | 0.01428 |
| 27 | −292.730 | 0.79 | | | 39.87 | | |
| 28 (aspheric surface) | −102.256 | 3.84 | 1.48749 | 70.2 | 39.84 | 0.53026 | 0.00244 |
| 29 | −83.218 | 2.50 | 1.80809 | 22.8 | 39.66 | 0.63070 | 0.02607 |
| 30 | −189.403 | (variable) | | | 39.71 | | |
| 31 | −86.554 | 1.70 | 1.77250 | 49.6 | 35.79 | | |
| 32 | 414.720 | 2.90 | 1.84666 | 23.9 | 36.91 | | |
| 33 | −354.912 | (variable) | | | 37.44 | | |
| 34 (stop) | ∞ | 1.50 | | | 38.93 | | |
| 35 (aspheric surface) | 74.233 | 7.20 | 1.67003 | 47.2 | 40.62 | | |
| 36 | −83.618 | 2.00 | 1.49700 | 81.5 | 40.68 | | |
| 37 | 45.850 | 1.01 | | | 40.45 | | |
| 38 | 46.839 | 8.73 | 1.48749 | 70.2 | 40.95 | | |
| 39 | −122.373 | 1.80 | 1.90200 | 25.1 | 40.92 | | |
| 40 | −260.922 | 43.82 | | | 41.08 | | |
| 41 | 864.110 | 5.68 | 1.80809 | 22.8 | 40.87 | | |
| 42 | −68.793 | 0.20 | | | 41.05 | | |
| 43 | −91.199 | 2.00 | 1.90200 | 25.1 | 40.65 | | |
| 44 | 49.390 | 8.93 | 1.49700 | 81.5 | 40.86 | | |
| 45 | −167.043 | 0.20 | | | 41.79 | | |
| 46 | 195.239 | 3.00 | 1.80809 | 22.8 | 42.61 | | |
| 47 | −673.864 | 1.74 | | | 42.71 | | |
| 48 | 67.387 | 11.00 | 1.49700 | 81.5 | 43.12 | | |
| 49 | −53.899 | 1.80 | 1.90200 | 25.1 | 42.59 | | |
| 50 | 175.569 | 0.20 | | | 42.96 | | |
| 51 | 110.578 | 6.69 | 1.80809 | 22.8 | 43.28 | | |
| 52 | −92.451 | (variable) | | | 43.27 | | |
| 53 | ∞ | 50.00 | 1.69680 | 55.5 | 37.38 | | |
| 54 | ∞ | 19.00 | 1.51633 | 64.1 | 25.26 | | |
| 55 | ∞ | 9.81 | | | 20.10 | | |
| image plane | ∞ | | | | | | | average ΔθgF of negative lenses of second lens unit = 0.03349 aspheric surface data 21-th surface k = −1.07833e+002      A4 = 3.60350e−006      A6 = −7.00622e−010
A8 = −1.42258e−012    A10 = 2.58562e−015    A12 = −9.84999e−019

23-th surface k = −1.16441e+012      A4 = −1.24941e−005    A6 = −1.03691e−008
A8 = 1.00768e−011      A10 = 3.02421e−015

-continued

28-th surface

| k = −1.37233e+001 | A4 = 6.53390e−006 | A6 = 5.79236e−009 |
| A8 = −2.37693e−012 | A10 = −8.63406e−015 | A12 = 7.76432e−018 |

35-th surface

| k = −9.25857e+000 | A4 = 1.86882e−006 | A6 = −1.59493e−009 |
| A8 = 4.52599e−013 | A10 = 8.55681e−016 | A12 = −9.64587e−019 | various kinds of data
zoom ratio 11.48

| | | | | | |
|---|---|---|---|---|---|
| focal length | 10.26 | 32.43 | 58.95 | 89.33 | 117.82 |
| F-number | 1.84 | 1.84 | 1.84 | 1.84 | 1.97 |
| angle of view | 37.95 | 13.86 | 7.73 | 5.12 | 3.88 |
| image height | 8.00 | 8.00 | 8.00 | 8.00 | 8.00 |
| entire lens length | 564.47 | 564.47 | 564.47 | 564.47 | 564.47 |
| BF | 9.81 | 9.81 | 9.81 | 9.81 | 9.81 |
| d20 | 3.91 | 84.27 | 109.39 | 122.33 | 128.92 |
| d30 | 131.36 | 31.51 | 5.66 | 1.95 | 6.97 |
| d33 | 3.20 | 22.03 | 22.62 | 13.52 | 2.04 |
| d52 | 11.57 | 12.22 | 12.35 | 12.23 | 12.11 |
| entrance pupil position | 103.60 | 190.05 | 262.61 | 328.34 | 376.56 |
| exit pupil position | 920.84 | 920.19 | 920.05 | 920.17 | 920.29 |
| front principal point position | 113.98 | 223.64 | 325.38 | 426.43 | 509.63 |
| rear principal point position | −0.45 | −22.62 | −49.14 | −79.52 | −108.01 | zoom lens unit data

| unit | start surface | focal length | lens configuration length | front principal point position | rear principal point position |
|---|---|---|---|---|---|
| 1 | 1 | 109.10 | 185.13 | 130.72 | 77.53 |
| 2 | 21 | −40.63 | 38.38 | 5.06 | −24.73 |
| 3 | 31 | −158.58 | 4.60 | −0.98 | −3.54 |
| 4 | 34 | 75.12 | 107.51 | 80.96 | −66.80 |
| G | 53 | ∞ | 69.00 | 21.00 | −21.00 | single lens data

| lens | start surface | focal length |
|---|---|---|
| 1 | 1 | −293.55 |
| 2 | 3 | −304.80 |
| 3 | 5 | −151.40 |
| 4 | 7 | 198.32 |
| 5 | 9 | 1354.89 |
| 6 | 11 | 207.71 |
| 7 | 12 | −391.62 |
| 8 | 14 | −181.07 |
| 9 | 15 | 184.33 |
| 10 | 17 | 209.24 |
| 11 | 19 | 385.98 |
| 12 | 21 | −62.02 |
| 13 | 23 | −92.02 |
| 14 | 25 | 45.24 |
| 15 | 26 | −68.14 |
| 16 | 28 | 860.06 |
| 17 | 29 | −185.64 |
| 18 | 31 | −92.56 |
| 19 | 32 | 226.27 |
| 20 | 35 | 59.78 |
| 21 | 36 | −59.28 |
| 22 | 38 | 70.68 |
| 23 | 39 | −257.08 |
| 24 | 41 | 79.07 |
| 25 | 43 | −35.28 |
| 26 | 44 | 77.76 |
| 27 | 46 | 187.62 |
| 28 | 48 | 62.13 |
| 29 | 49 | −45.55 |
| 30 | 51 | 63.24 |

-continued

| | | |
|---|---|---|
| 31 | 53 | 0.00 |
| 32 | 54 | 0.00 |

Numerical Example 2 f = 10.26 to 118.00 mm
Fno = 1.84 to 2.05
2ω = 75.88 to 7.76

| surface number | r | d | nd | $\nu_d$ | effective diameter | θgF | ΔθgF |
|---|---|---|---|---|---|---|---|
| 1 | 108.125 | 3.80 | 1.73400 | 51.5 | 143.89 | 0.54839 | −0.00980 |
| 2 | 75.013 | 38.66 | | | 125.89 | | |
| 3 | −865.692 | 3.30 | 1.69680 | 55.5 | 123.60 | 0.54343 | 0.00821 |
| 4 | 188.720 | 20.11 | | | 116.44 | | |
| 5 | −176.020 | 3.20 | 1.65160 | 58.5 | 116.04 | 0.54178 | 0.00497 |
| 6 | 356.974 | 0.20 | | | 117.08 | | |
| 7 | 205.680 | 13.12 | 1.80518 | 25.4 | 118.38 | 0.61655 | 0.01623 |
| 8 | −725.579 | 6.90 | | | 118.19 | | |
| 9 | −335.149 | 5.54 | 1.43875 | 94.9 | 116.90 | 0.53463 | 0.04681 |
| 10 | −226.278 | 1.90 | | | 116.58 | | |
| 11 | −2802.317 | 21.07 | 1.43875 | 94.9 | 113.01 | 0.53463 | 0.04681 |
| 12 | −94.953 | 3.60 | 1.73800 | 32.3 | 112.14 | 0.59029 | 0.00104 |
| 13 | 129.159 | 17.99 | | | 112.57 | | |
| 14 | 407.802 | 3.80 | 1.72342 | 38.0 | 106.27 | 0.58342 | 0.00336 |
| 15 | 113.599 | 16.26 | 1.43875 | 94.9 | 104.33 | 0.53463 | 0.04681 |
| 16 | −550.324 | 0.20 | | | 104.35 | | |
| 17 | 173.376 | 15.49 | 1.43387 | 95.1 | 103.82 | 0.53728 | 0.04975 |
| 18 | −219.949 | 0.20 | | | 103.52 | | |
| 19 | 117.682 | 9.48 | 1.43875 | 94.9 | 95.84 | 0.53463 | 0.04681 |
| 20 | 426.593 | (variable) | | | 94.98 | | |
| 21(aspheric surface) | −121.925 | 3.00 | 1.49700 | 81.5 | 49.46 | 0.53859 | 0.02916 |
| 22 | 36.271 | 9.15 | | | 40.00 | | |
| 23(aspheric surface) | 24717.452 | 2.00 | 1.49700 | 81.5 | 39.49 | 0.53859 | 0.02916 |
| 24 | 45.084 | 4.41 | | | 38.21 | | |
| 25 | 510.522 | 7.22 | 1.59551 | 39.2 | 38.35 | 0.57971 | 0.00172 |
| 26 | −36.644 | 2.00 | 1.59282 | 68.6 | 38.53 | 0.54461 | 0.01428 |
| 27 | −362.631 | 0.49 | | | 39.41 | | |
| 28(aspheric surface) | −143.387 | 3.84 | 1.48749 | 70.2 | 39.57 | 0.53026 | 0.00244 |
| 29 | −84.066 | 2.50 | 1.85026 | 32.3 | 39.57 | 0.59339 | 0.00416 |
| 30 | −102.570 | (variable) | | | 9.84 | | |
| 31 | −91.487 | 1.70 | 1.77250 | 49.6 | 34.90 | | |
| 32 | 199.283 | 2.90 | 1.84666 | 23.9 | 36.01 | | |
| 33 | −2394.301 | (variable) | | | 36.51 | | |
| 34 (stop) | ∞ | 1.50 | | | 37.44 | | |
| 35(aspheric surface) | 72.901 | 7.20 | 1.67003 | 47.2 | 39.24 | | |
| 36 | −73.672 | 2.00 | 1.49700 | 81.5 | 39.36 | | |
| 37 | 43.445 | 0.49 | | | 39.38 | | |
| 38 | 44.221 | 8.73 | 1.48749 | 70.2 | 39.64 | | |
| 39 | −99.076 | 1.80 | 1.90200 | 25.1 | 39.67 | | |
| 40 | −175.164 | (variable) | | | 39.93 | | |
| 41 | 3508.689 | 5.68 | 1.80809 | 22.8 | 41.09 | | |
| 42 | −64.225 | 0.20 | | | 41.31 | | |
| 43 | −81.532 | 2.00 | 1.90200 | 25.1 | 40.92 | | |
| 44 | 50.385 | 8.93 | 1.49700 | 81.5 | 41.39 | | |
| 45 | −146.128 | 0.20 | | | 42.35 | | |
| 46 | 227.531 | 3.00 | 1.80809 | 22.8 | 43.29 | | |
| 47 | −499.398 | (variable) | | | 43.44 | | |
| 48 | 67.979 | 11.00 | 1.49700 | 81.5 | 44.09 | | |
| 49 | −54.919 | 1.80 | 1.90200 | 25.1 | 43.65 | | |
| 50 | 349.443 | 0.20 | | | 44.11 | | |
| 51 | 142.425 | 6.69 | 1.80809 | 22.8 | 44.41 | | |
| 52 | −93.241 | (variable) | | | 44.39 | | |
| 53 | ∞ | 50.00 | 1.69680 | 55.5 | 38.39 | | |
| 54 | ∞ | 19.00 | 1.51633 | 64.1 | 25.74 | | |
| 55 | ∞ | 9.96 | | | 20.35 | | |
| image plane | ∞ | | | | | | | average ΔθgF of negative lenses of second lens unit = 0.01919 aspheric surface data 21-th surface k = −5.34894e+001   A4 = 3.11630e−006   A6 = 1.37440e−009
A8 = −5.49735e−012   A10 = 8.10530e−015   A12 = −4.29400e−018

-continued f = 10.26 to 118.00 mm
Fno = 1.84 to 2.05
2ω = 75.88 to 7.76

23-th surface

| k = −9.42642e+011 | A4 = −1.55957e−005 | A6 = −8.86145e−009 |
| A8 = 1.41958e−011 | A10 = 5.92689e−015 | |

28-th surface

| k = −4.65785e+001 | A4 = 7.12735e−006 | A6 = 7.08669e−009 |
| A8 = −1.39051e−011 | A10 = 6.71270e−015 | A12 = −3.12588e−018 |

35-th surface

| k = −8.66826e+000 | A4 = 1.64749e−006 | A6 = −1.50285e−009 |
| A8 = 5.90584e−013 | A10 = 3.20965e−016 | A12 = −4.34636e−019 | various kinds of data
zoom ratio 11.50

| | | | | | |
|---|---|---|---|---|---|
| focal length | 10.26 | 32.72 | 59.13 | 89.28 | 118.00 |
| F-number | 1.84 | 1.89 | 1.91 | 1.91 | 2.05 |
| angle of view | 37.94 | 13.74 | 7.70 | 5.12 | 3.88 |
| image height | 8.00 | 8.00 | 8.00 | 8.00 | 8.00 |
| entire lens length | 565.05 | 565.05 | 565.05 | 565.05 | 565.05 |
| BF | 9.96 | 9.96 | 9.96 | 9.96 | 9.96 |
| d20 | 4.90 | 78.12 | 103.55 | 117.09 | 124.10 |
| d30 | 129.50 | 29.49 | 5.25 | 2.00 | 6.28 |
| d33 | 2.00 | 16.26 | 17.45 | 10.80 | 2.08 |
| d40 | 51.37 | 49.93 | 44.14 | 39.24 | 36.19 |
| d47 | 1.79 | 14.44 | 18.18 | 20.00 | 20.89 |
| d52 | 11.06 | 12.37 | 12.05 | 11.48 | 11.07 |
| entrance pupil position | 109.61 | 188.96 | 259.53 | 329.73 | 386.74 |
| exit pupil position | 323.53 | 240.00 | 281.00 | 343.45 | 402.37 |
| front principal point position | 120.21 | 226.34 | 331.57 | 442.91 | 540.22 |
| rear principal point position | −0.30 | −22.76 | −49.17 | −79.32 | −108.04 | zoom lens unit data

| unit | start surface | focal length | lens configuration length | front principal point position | rear principal point position |
|---|---|---|---|---|---|
| 1 | 1 | 109.38 | 184.83 | 133.20 | 69.20 |
| 2 | 21 | −39.54 | 34.62 | 2.53 | −25.77 |
| 3 | 31 | −129.74 | 4.60 | −0.16 | −2.69 |
| 4 | 34 | 84.29 | 21.72 | 4.03 | −10.71 |
| 5 | 41 | 380.95 | 20.02 | 23.39 | 11.78 |
| 6 | 48 | 88.04 | 19.69 | 7.04 | −5.78 |
| G | 53 | ∞ | 69.00 | 21.00 | −21.00 | single lens data

| lens | start surface | focal length |
|---|---|---|
| 1 | 1 | −350.76 |
| 2 | 3 | −222.08 |
| 3 | 5 | −180.50 |
| 4 | 7 | 200.29 |
| 5 | 9 | 1563.36 |
| 6 | 11 | 223.48 |
| 7 | 12 | −508.54 |
| 8 | 14 | −218.85 |
| 9 | 15 | 216.23 |
| 10 | 17 | 226.15 |
| 11 | 19 | 366.97 |
| 12 | 21 | −55.89 |
| 13 | 23 | −90.88 |
| 14 | 25 | 57.70 |
| 15 | 26 | −68.92 |
| 16 | 28 | 408.17 |
| 17 | 29 | −584.33 |
| 18 | 31 | −80.96 |
| 19 | 32 | 217.40 |
| 20 | 35 | 55.79 |

-continued

| | | |
|---|---|---|
| f = 10.26 to 118.00 mm | | |
| Fno = 1.84 to 2.05 | | |
| 2ω = 75.88 to 7.76 | | |
| 21 | 36 | −54.68 |
| 22 | 38 | 64.00 |
| 23 | 39 | −255.73 |
| 24 | 41 | 78.10 |
| 25 | 43 | −34.28 |
| 26 | 44 | 76.54 |
| 27 | 46 | 193.79 |
| 28 | 48 | 62.99 |
| 29 | 49 | −52.51 |
| 30 | 51 | 70.63 |
| 31 | 53 | 0.00 |
| 32 | 54 | 0.00 |

Numerical Example 3 f = 10.24 to 117.54 mm
Fno = 1.84 to 2.04
2ω = 75.98 to 7.78°

| surface number | r | d | nd | $\nu_d$ | effective diameter | θgF | ΔθgF |
|---|---|---|---|---|---|---|---|
| 1 | 115.415 | 3.80 | 1.73400 | 51.5 | 147.96 | 0.54839 | −0.00980 |
| 2 | 79.075 | 38.06 | | | 129.89 | | |
| 3 | −2714.558 | 3.30 | 1.69680 | 55.5 | 126.43 | 0.54343 | 0.00821 |
| 4 | 202.956 | 20.19 | | | 119.42 | | |
| 5 | −178.104 | 3.20 | 1.65160 | 58.5 | 118.94 | 0.54178 | −0.00497 |
| 6 | 265.064 | 0.20 | | | 119.06 | | |
| 7 | 192.226 | 13.24 | 1.80518 | 25.4 | 120.03 | 0.61655 | 0.01623 |
| 8 | −1094.011 | 10.97 | | | 119.79 | | |
| 9 | −243.636 | 5.54 | 1.59282 | 68.6 | 118.12 | 0.54461 | 0.01428 |
| 10 | −189.694 | 1.90 | | | 118.11 | | |
| 11 | −4132.475 | 21.16 | 1.49700 | 81.5 | 113.54 | 0.53859 | 0.02916 |
| 12 | −95.758 | 3.60 | 1.73800 | 32.3 | 112.68 | 0.59029 | 0.00104 |
| 13 | −145.706 | 17.47 | | | 112.53 | | |
| 14 | 682.283 | 3.80 | 1.72342 | 38.0 | 107.17 | 0.58342 | 0.00336 |
| 15 | 110.546 | 16.81 | 1.49700 | 81.5 | 105.52 | 0.53859 | 0.02916 |
| 16 | −601.808 | 0.20 | | | 105.56 | | |
| 17 | 162.777 | 16.04 | 1.43387 | 95.1 | 105.20 | 0.53728 | 0.04975 |
| 18 | −219.082 | 0.20 | | | 104.99 | | |
| 19 | 127.978 | 7.98 | 1.59282 | 68.6 | 95.89 | 0.54461 | 0.01428 |
| 20 | 346.641 | (variable) | | | 94.87 | | |
| 21(aspheric surface) | 207.601 | 3.00 | 1.80400 | 46.6 | 46.98 | 0.55736 | 0.00874 |
| 22 | 32.768 | 8.87 | | | 39.74 | | |
| 23(aspheric surface) | 22490.474 | 2.00 | 1.43875 | 94.9 | 39.29 | 0.53463 | 0.04681 |
| 24 | 35.173 | 3.57 | | | 38.08 | | |
| 25 | 68.337 | 10.78 | 1.62588 | 35.7 | 38.36 | 0.58894 | 0.00521 |
| 26 | −35.923 | 2.00 | 1.59282 | 68.6 | 38.37 | 0.54461 | 0.01428 |
| 27 | 118.940 | 3.34 | | | 38.17 | | |
| 28(aspheric surface) | −99.541 | 3.84 | 1.48749 | 70.2 | 38.35 | 0.53026 | 0.00244 |
| 29 | −60.421 | 2.50 | 1.80809 | 22.8 | 38.43 | 0.63070 | 0.02607 |
| 30 | −72.114 | (variable) | | | 38.92 | | |
| 31 | −94.270 | 1.70 | 1.77250 | 49.6 | 35.60 | | |
| 32 | 244.273 | 2.90 | 1.84666 | 23.9 | 36.69 | | |
| 33 | −907.578 | (variable) | | | 37.19 | | |
| 34 (stop) | ∞ | 1.50 | | | 38.21 | | |
| 35(aspheric surface) | 69.381 | 7.20 | 1.67003 | 47.2 | 40.06 | | |
| 36 | −86.948 | 2.00 | 1.49700 | 81.5 | 40.12 | | |
| 37 | 43.108 | 0.80 | | | 39.91 | | |
| 38 | 44.836 | 8.73 | 1.48749 | 70.2 | 40.28 | | |
| 39 | −128.936 | 1.80 | 1.90200 | 25.1 | 40.28 | | |
| 40 | −241.268 | (variable) | | | 40.45 | | |
| 41 | −1036.950 | 5.68 | 1.80809 | 22.8 | 41.76 | | |
| 42 | −61.516 | 0.20 | | | 42.02 | | |
| 43 | −76.787 | 2.00 | 1.90200 | 25.1 | 41.62 | | |
| 44 | 52.885 | 8.93 | 1.49700 | 81.5 | 42.28 | | |
| 45 | −104.631 | 0.20 | | | 43.06 | | |
| 46 | 122.443 | 3.00 | 1.80809 | 22.8 | 44.42 | | |
| 47 | 509.733 | (variable) | | | 44.42 | | |
| 48 | 71.393 | 11.00 | 1.49700 | 81.5 | 44.68 | | |
| 49 | −55.309 | 1.80 | 1.90200 | 25.1 | 44.20 | | |
| 50 | 280.326 | 0.20 | | | 44.59 | | |

-continued f = 10.24 to 117.54 mm
Fno = 1.84 to 2.04
2ω = 75.98 to 7.78°

| | | | | | |
|---|---|---|---|---|---|
| 51 | 126.944 | 6.69 | 1.80809 | 22.8 | 44.92 |
| 52 | −99.498 | 11.04 | | | 44.86 |
| 53 | ∞ | 50.00 | 1.69680 | 55.5 | 38.86 |
| 54 | ∞ | 19.00 | 1.51633 | 64.1 | 26.05 |
| 55 | ∞ | 10.43 | | | 20.60 |
| image plane | ∞ | | | | | average ΔθgF of negative lenses of second lens unit = 0.01961 aspheric surface data 21-th surface k = −5.42851e+001   A4 = 6.10195e−007   A6 = 1.33912e−009
A8 = −3.46471e−012  A10 = 2.25922e−015  A12 = −1.16526e−018

23-th surface k = −8.88662e+011   A4 = −4.71106e−006  A6 = −1.10397e−008
A8 = 7.79524e−012   A10 = 1.05223e−014

28-th surface k = −8.56471e+000   A4 = 5.69819e−006   A6 = 6.14121e−009
A8 = −1.13450e−013  A10 = −7.09504e−015 A12 = 8.86924e−018

35-th surface k = −6.91952e+000   A4 = 1.57747e−006   A6 = −1.27029e−009
A8 = 9.23707e−013   A10 = −7.26980e−016 A12 = 3.81888e−019 various kinds of data
zoom ratio 11.47

| | | | | | |
|---|---|---|---|---|---|
| focal length | 10.24 | 32.56 | 58.85 | 88.95 | 117.54 |
| F-number | 1.84 | 1.91 | 1.93 | 1.94 | 2.04 |
| angle of view | 37.99 | 13.80 | 7.74 | 5.14 | 3.89 |
| image height | 8.00 | 8.00 | 8.00 | 8.00 | 8.00 |
| entire lens length | 572.32 | 572.32 | 572.32 | 572.32 | 572.32 |
| BF | 10.43 | 10.43 | 10.43 | 10.43 | 10.43 |
| d20 | 6.68 | 75.85 | 99.04 | 111.27 | 117.56 |
| d30 | 126.45 | 27.85 | 4.52 | 2.28 | 7.31 |
| d33 | 2.18 | 19.49 | 20.05 | 11.96 | 2.09 |
| d40 | 51.98 | 49.79 | 45.30 | 41.79 | 39.67 |
| d47 | 0.65 | 14.97 | 19.05 | 20.65 | 21.31 |
| entrance pupil position | 111.79 | 192.09 | 263.20 | 333.29 | 389.26 |
| exit pupil position | 358.51 | 271.50 | 302.35 | 346.76 | 384.61 |
| front principal point position | 122.33 | 228.71 | 333.91 | 445.77 | 543.72 |
| rear principal point position | 0.19 | −22.13 | −48.42 | −78.52 | −107.11 | zoom lens unit data

| unit | start surface | focal length | lens configuration length | front principal point position | rear principal point position |
|---|---|---|---|---|---|
| 1 | 1 | 103.93 | 187.66 | 132.60 | 65.93 |
| 2 | 21 | −37.62 | 39.90 | 2.77 | −29.04 |
| 3 | 31 | −144.16 | 4.60 | −0.38 | −2.92 |
| 4 | 34 | 87.95 | 22.03 | 3.62 | −11.39 |
| 5 | 41 | 315.38 | 20.02 | 22.09 | 10.59 |
| 6 | 48 | 94.12 | 19.69 | 6.98 | −5.80 |
| G | 53 | ∞ | 69.00 | 21.00 | −21.00 | single lens data

| lens | start surface | focal length |
|---|---|---|
| 1 | 1 | −358.00 |
| 2 | 3 | −270.88 |
| 3 | 5 | −163.02 |
| 4 | 7 | 203.99 |
| 5 | 9 | 1392.00 |
| 6 | 11 | 196.90 |
| 7 | 12 | −390.46 |

-continued f = 10.24 to 117.54 mm
Fno = 1.84 to 2.04
2ω = 75.98 to 7.78°

| | | |
|---|---|---|
| 8 | 14 | −182.87 |
| 9 | 15 | 189.39 |
| 10 | 17 | 218.02 |
| 11 | 19 | 337.64 |
| 12 | 21 | −48.77 |
| 13 | 23 | −80.30 |
| 14 | 25 | 39.18 |
| 15 | 26 | −46.32 |
| 16 | 28 | 305.55 |
| 17 | 29 | −509.85 |
| 18 | 31 | −87.86 |
| 19 | 32 | 227.59 |
| 20 | 35 | 58.68 |
| 21 | 36 | −57.69 |
| 22 | 38 | 69.38 |
| 23 | 39 | −309.37 |
| 24 | 41 | 80.72 |
| 25 | 43 | −34.47 |
| 26 | 44 | 72.04 |
| 27 | 46 | 198.74 |
| 28 | 48 | 64.57 |
| 29 | 49 | −51.08 |
| 30 | 51 | 69.95 |
| 31 | 53 | 0.00 |
| 32 | 54 | 0.00 |

Numerical Example 4 f = 10.17 to 118.50 mm
Fno = 1.87 to 2.05
2ω = 76.36 to 7.72°

| surface number | r | d | nd | $\nu_d$ | effective diameter | θgF | ΔθgF |
|---|---|---|---|---|---|---|---|
| 1 | 191.892 | 3.80 | 1.77250 | 49.6 | 158.03 | 0.55234 | −0.00885 |
| 2 | 100.258 | 24.61 | | | 138.94 | | |
| 3 | 650.306 | 3.30 | 1.71300 | 53.9 | 138.63 | 0.54532 | 0.00902 |
| 4 | 156.194 | 24.38 | | | 130.40 | | |
| 5 | −239.306 | 3.20 | 1.69680 | 55.5 | 129.98 | 0.55234 | −0.00885 |
| 6 | 369.588 | 0.20 | | | 130.33 | | |
| 7 | 220.468 | 15.33 | 1.84666 | 23.8 | 131.63 | 0.61910 | 0.01612 |
| 8 | −1760.201 | 4.72 | | | 131.08 | | |
| 9 | −866.782 | 8.63 | 1.49700 | 81.5 | 129.98 | 0.53859 | 0.02916 |
| 10 | −238.196 | 0.15 | | | 129.66 | | |
| 11 | −8084.644 | 22.35 | 1.51633 | 64.1 | 124.72 | 0.53416 | 0.00353 |
| 12 | −109.355 | 3.60 | 1.69895 | 30.1 | 123.49 | 0.60302 | 0.01030 |
| 13 | −222.869 | 20.26 | | | 121.38 | | |
| 14 | 223.194 | 3.80 | 1.74950 | 35.3 | 119.32 | 0.58180 | −0.00249 |
| 15 | 105.166 | 21.72 | 1.49700 | 81.5 | 116.91 | 0.53859 | 0.02916 |
| 16 | −1004.888 | 0.20 | | | 116.93 | | |
| 17 | 167.387 | 19.12 | 1.43387 | 95.1 | 116.40 | 0.53728 | 0.04975 |
| 18 | −262.129 | 0.20 | | | 115.85 | | |
| 19 | 147.146 | 8.56 | 1.43387 | 95.1 | 106.05 | 0.53728 | 0.04975 |
| 20 | 360.823 | (variable) | | | 104.46 | | |
| 21(aspheric surface) | 284.906 | 1.80 | 1.43875 | 94.9 | 53.57 | 0.53463 | 0.04681 |
| 22 | 30.769 | 10.00 | | | 43.27 | | |
| 23 | −259.354 | 1.80 | 1.43875 | 94.9 | 43.11 | 0.53463 | 0.04681 |
| 24 | 50.517 | 2.00 | | | 40.11 | | |
| 25 | 77.261 | 2.00 | 1.59282 | 68.6 | 39.99 | 0.54461 | 0.01428 |
| 26 | 52.072 | 8.82 | | | 38.86 | | |
| 27 | −43.691 | 2.95 | 1.59240 | 68.3 | 38.81 | 0.54556 | 0.01464 |
| 28 | 1047.637 | 2.96 | | | 41.07 | | |
| 29 | 132.444 | 6.17 | 1.62004 | 36.3 | 43.36 | 0.58830 | 0.00550 |
| 30 | −72.025 | (variable) | | | 43.53 | | |
| 31 (stop) | ∞ | 1.75 | | | 36.73 | | |
| 32(aspheric surface) | 193.422 | 2.83 | 1.49700 | 81.5 | 37.15 | | |
| 33 | −1663.631 | 0.25 | | | 37.26 | | |
| 34 | 44.026 | 3.60 | 1.76182 | 26.6 | 37.64 | | |
| 35 | 54.454 | 0.65 | | | 36.72 | | |

-continued f = 10.17 to 118.50 mm
Fno = 1.87 to 2.05
2ω = 76.36 to 7.72°

| | | | | | |
|---|---|---|---|---|---|
| 36 | 56.314 | 2.00 | 1.77250 | 49.6 | 36.68 |
| 37 | 44.220 | (variable) | | | 35.75 |
| 38 | −1528.998 | 6.05 | 1.61800 | 63.3 | 40.10 |
| 39 | −98.131 | 0.20 | | | 40.83 |
| 40 | 254.114 | 2.00 | 1.78590 | 44.2 | 40.93 |
| 41 | 47.499 | 11.25 | 1.49700 | 81.5 | 40.62 |
| 42 | −113.178 | (variable) | | | 41.20 |
| 43 | 427.178 | 10.15 | 1.49700 | 81.5 | 41.19 |
| 44 | −43.801 | 1.80 | 1.77250 | 49.6 | 41.04 |
| 45(aspheric surface) | −790.301 | 0.20 | | | 41.93 |
| 46 | 70.910 | 12.40 | 1.43387 | 95.1 | 42.77 |
| 47 | −57.931 | (variable) | | | 42.57 |
| 48 | ∞ | 50.00 | 1.69680 | 55.5 | 39.42 |
| 49 | ∞ | 19.00 | 1.51633 | 64.2 | 27.12 |
| 50 | ∞ | (variable) | | | 21.87 |
| image plane | ∞ | | | | | average ΔθgF of negative lenses of second lens unit = 0.03064 aspheric surface data 21-th surface k = −2.22986e+000   A4 = −2.19298e−007   A6 = −4.18697e−010
A8 = −1.05182e−013   A10 = 1.74620e−016

32-th surface k = 1.05639e+001   A4 = −1.08639e−006   A6 = −7.33608e−011
A8 = −1.34916e−013   A10 = −1.15160e−016

45-th surface k = 5.01453e+002   A4 = 4.44844e−007   A6 = 2.11058e−010
A8 = 1.59689e−013   A10 = 5.17543e−017 various kinds of data
zoom ratio 11.65

| | wide-angle | middle | telephoto |
|---|---|---|---|
| focal length | 10.17 | 56.88 | 118.50 |
| F-number | 1.87 | 2.00 | 2.05 |
| angle of view | 38.18 | 8.01 | 3.86 |
| image height | 8.00 | 8.00 | 8.00 |
| entire lens length | 555.52 | 556.64 | 556.84 |
| BF | 13.86 | 15.01 | 15.17 |
| d20 | 1.30 | 97.55 | 121.61 |
| d30 | 140.68 | 25.82 | 3.81 |
| d37 | 45.00 | 51.27 | 59.53 |
| d42 | 0.55 | 1.90 | 0.55 |
| d47 | 3.37 | 14.33 | 5.41 |
| d50 | 13.86 | 15.01 | 15.17 |
| entrance pupil position | 105.00 | 263.86 | 416.43 |
| exit pupil position | 629.59 | 315.32 | 207.43 |
| front principal point position | 115.34 | 331.51 | 607.98 |
| rear principal point position | 3.68 | −41.87 | −103.34 | zoom lens unit data

| unit | start surface | focal length | lens configuration length | front principal point position | rear principal point position |
|---|---|---|---|---|---|
| 1 | 1 | 115.01 | 188.13 | 125.71 | 61.78 |
| 2 | 21 | −38.61 | 38.50 | 3.60 | −33.50 |
| 3 | 31 | 280.49 | 11.08 | −14.12 | −20.55 |
| 4 | 38 | 138.42 | 19.50 | 8.31 | −4.44 |
| 5 | 43 | 106.95 | 24.56 | 14.80 | −2.06 |
| G | 48 | ∞ | 69.00 | 21.00 | −21.00 |

-continued f = 10.17 to 118.50 mm
Fno = 1.87 to 2.05
2ω = 76.36 to 7.72° single lens data

| lens | start surface | focal length |
|---|---|---|
| 1 | 1 | −276.78 |
| 2 | 3 | −289.12 |
| 3 | 5 | −208.01 |
| 4 | 7 | 232.24 |
| 5 | 9 | 657.88 |
| 6 | 11 | 214.49 |
| 7 | 12 | −311.24 |
| 8 | 14 | −269.05 |
| 9 | 15 | 192.81 |
| 10 | 17 | 238.66 |
| 11 | 19 | 565.84 |
| 12 | 21 | −78.79 |
| 13 | 23 | −96.20 |
| 14 | 25 | −277.63 |
| 15 | 27 | −70.73 |
| 16 | 29 | 76.12 |
| 17 | 32 | 348.82 |
| 18 | 34 | 262.56 |
| 19 | 36 | −287.24 |
| 20 | 38 | 169.40 |
| 21 | 40 | −74.65 |
| 22 | 41 | 68.92 |
| 23 | 43 | 80.51 |
| 24 | 44 | −60.09 |
| 25 | 46 | 75.69 |
| 26 | 48 | 0.00 |
| 27 | 49 | 0.00 |

Numerical Example 5 f = 10.41 to 127.95 mm
Fno = 1.88 to 4.00
2ω = 75.1 to 7.16°

| surface number | r | d | nd | $v_d$ | effective diameter | θgF | ΔθgF |
|---|---|---|---|---|---|---|---|
| 1 | −4560.326 | 7.30 | 1.80610 | 33.3 | 155.97 | 0.58811 | 0.00047 |
| 2 | 217.835 | 17.84 | 1.49700 | 81.5 | 141.66 | 0.53859 | 0.02916 |
| 3 | −810.701 | 0.15 | | | 139.47 | | |
| 4 | 280.148 | 11.65 | 1.59240 | 68.3 | 125.48 | 0.54556 | 0.01464 |
| 5 | −1434.318 | 0.15 | | | 122.31 | | |
| 6 | 146.187 | 9.08 | 1.63854 | 55.4 | 100.10 | 0.54900 | −0.00286 |
| 7 | 383.090 | (variable) | | | 95.38 | | |
| 8(aspheric surface) | −140.039 | 2.50 | 1.49700 | 81.5 | 90.20 | 0.53859 | 0.02916 |
| 9 | 32.325 | 17.10 | | | 59.52 | | |
| 10 | 148.095 | 2.50 | 1.43875 | 94.9 | 59.45 | 0.53463 | 0.04681 |
| 11(aspheric surface) | 35.150 | 19.20 | | | 56.84 | | |
| 12 | −61.933 | 7.00 | 1.64769 | 33.8 | 56.88 | 0.59447 | 0.00770 |
| 13 | −42.069 | 2.50 | 1.59282 | 68.6 | 57.86 | 0.54461 | 0.01428 |
| 14 | −105.874 | 2.00 | | | 61.35 | | |
| 15(aspheric surface) | 1487.915 | 6.53 | 1.64769 | 33.8 | 63.12 | 0.59447 | 0.00770 |
| 16 | −119.493 | 2.00 | 1.80809 | 22.8 | 63.20 | 0.63070 | 0.02607 |
| 17 | −153.980 | (variable) | | | 63.53 | | |
| 18(aspheric surface) | 74.026 | 9.23 | 1.65844 | 50.9 | 39.79 | | |
| 19 | −57.152 | 0.07 | | | 39.39 | | |
| 20 | −56.535 | 2.50 | 1.51633 | 64.1 | 39.37 | | |
| 21 | 56.719 | 9.75 | | | 37.68 | | |
| 22 (stop) | ∞ | 35.50 | | | 39.17 | | |
| 23 | −675.547 | 11.93 | 1.49700 | 81.5 | 48.80 | | |
| 24 | −51.726 | 0.81 | | | 50.22 | | |
| 25 | 218.892 | 7.22 | 1.56907 | 71.3 | 48.60 | | |
| 26 | −56.381 | 0.11 | | | 48.52 | | |
| 27 | −56.138 | 2.10 | 1.83400 | 37.2 | 48.39 | | |
| 28 | −3884.412 | (variable) | | | 48.18 | | |
| 29 | 201.399 | 3.30 | 1.49700 | 81.5 | 37.46 | | |
| 30 | −199.074 | 7.67 | | | 37.37 | | |
| 31 | −54.112 | 2.00 | 1.69680 | 55.5 | 36.43 | | |

-continued $f = 10.41$ to $127.95$ mm
$Fno = 1.88$ to $4.00$
$2\omega = 75.1$ to $7.16°$

| | | | | | |
|---|---|---|---|---|---|
| 32 | 50.539 | 1.77 | | | 38.12 |
| 33 | 64.142 | 8.78 | 1.49700 | 81.5 | 39.42 |
| 34 | −106.027 | 0.10 | | | 40.94 |
| 35 | 101.226 | 10.25 | 1.59240 | 68.3 | 42.78 |
| 36(aspheric surface) | −55.841 | (variable) | | | 43.12 |
| 37 | ∞ | 50.00 | 1.69680 | 55.5 | 50.00 |
| 38 | ∞ | 19.00 | 1.51633 | 64.1 | 50.00 |
| 39 | ∞ | (variable) | | | 50.00 |
| image plane | ∞ | | | | | average $\Delta\theta gF$ of negative lenses of second lens unit = 0.02908 aspheric surface data 8-th surface

| | | |
|---|---|---|
| k = 5.74945e+000 | A4 = 2.46947e−006 | A6 = −9.48170e−010 |
| A8 = 2.45691e−013 | A10 = −1.65534e−017 | |

11-th surface

| | | |
|---|---|---|
| k = −1.12276e+000 | A4 = 2.39227e−006 | A6 = −1.39689e−009 |
| A8 = 4.08773e−012 | A10 = −7.37347e−015 | |

15-th surface

| | | |
|---|---|---|
| k = 4.12997e+002 | A4 = 8.30323e−007 | A6 = −2.08567e−010 |
| A8 = 8.84953e−013 | A10 = −9.61624e−016 | A12 = 2.08342e−019 |

18-th surface

| | | |
|---|---|---|
| k = −7.25070e+000 | A4 = 1.17569e−006 | A6 = −9.05415e−010 |
| A8 = −5.70160e−013 | A10 = 1.14771e−015 | A12 = −6.28781e−019 |

36-th surface

| | | |
|---|---|---|
| k = 1.09749e+000 | A4 = 9.03254e−007 | A6 = 4.10726e−010 |
| A8 = −6.59253e−013 | A10 = 1.15222e−015 | A12 = −7.83324e−019 | various kinds of data
zoom ratio 12.29

| | wide-angle | middle | telephoto |
|---|---|---|---|
| focal length | 10.41 | 69.47 | 127.95 |
| F-number | 1.88 | 3.60 | 4.00 |
| angle of view | 37.55 | 6.57 | 3.58 |
| image height | 8.00 | 8.00 | 8.00 |
| entire lens length | 566.08 | 571.93 | 614.63 |
| BF | 0.59 | 0.61 | 0.60 |
| d7 | 8.00 | 58.20 | 119.17 |
| d17 | 250.48 | 27.52 | 2.90 |
| d28 | 1.04 | 183.41 | 176.08 |
| d36 | 16.37 | 12.60 | 26.28 |
| d39 | 0.59 | 0.61 | 0.60 |
| entrance pupil position | 86.44 | 181.55 | 481.82 |
| exit pupil position | 13157.34 | 108.92 | 97.51 |
| front principal point position | 96.86 | 295.57 | 778.70 |
| rear principal point position | −9.81 | −68.86 | −127.34 | zoom lens unit data

| unit | start surface | focal length | lens configuration length | front principal point position | rear principal point position |
|---|---|---|---|---|---|
| 1 | 1 | 227.84 | 46.18 | 23.50 | −5.10 |
| 2 | 8 | −38.37 | 61.33 | 1.86 | −58.86 |
| 3 | 18 | 118.14 | 79.22 | 45.73 | −33.33 |
| 4 | 29 | 100.03 | 33.87 | 32.51 | 8.84 |
| G | 37 | ∞ | 69.00 | 21.00 | −21.00 |

-continued f = 10.41 to 127.95 mm
Fno = 1.88 to 4.00
2ω = 75.1 to 7.16° single lens data

| lens | start surface | focal length |
|---|---|---|
| 1 | 1 | −257.74 |
| 2 | 2 | 347.47 |
| 3 | 4 | 396.63 |
| 4 | 6 | 364.77 |
| 5 | 8 | −52.59 |
| 6 | 10 | −105.76 |
| 7 | 12 | 177.87 |
| 8 | 13 | −119.50 |
| 9 | 15 | 171.05 |
| 10 | 16 | −677.78 |
| 11 | 18 | 50.39 |
| 12 | 20 | −54.43 |
| 13 | 23 | 111.99 |
| 14 | 25 | 79.54 |
| 15 | 27 | −68.32 |
| 16 | 29 | 201.99 |
| 17 | 31 | −37.21 |
| 18 | 33 | 81.81 |
| 19 | 35 | 62.26 |
| 20 | 37 | 0.00 |
| 21 | 38 | 0.00 |

TABLE 1

| | Numerical Examples | | | | |
|---|---|---|---|---|---|
| | 1 | 2 | 3 | 4 | 5 |
| Condition (1) | 0.1340 | 0.0767 | 0.0784 | 0.1225 | 0.1163 |
| Condition (2) | 1.10 | 1.14 | 0.54 | 0.89 | 1.09 |
| Condition (3) | 95.0 | 81.6 | 95.0 | 95.0 | 81.6 |
| | 95.0 | 81.6 | — | 95.0 | 95.0 |
| Condition (4) | 0.1677 | 0.2532 | 0.1529 | 0.1704 | 0.0409 |
| Condition (5) | 3.14 | 3.14 | 3.00 | 3.31 | 6.24 |
| Condition (6) | −1.17 | −1.14 | −1.08 | −1.11 | −1.05 |
| Condition (7) | −2.69 | −2.77 | −2.76 | −2.98 | −5.94 |
| Condition (8) | 0.256 | 0.305 | 0.261 | 0.138 | 0.325 |
| Condition (9) | 0.00644 | 0.00172 | 0.00521 | 0.00550 | 0.00770 |
| | 0.00244 | 0.00244 | 0.00244 | — | 0.00770 |
| Condition (10) | 1.63980 | 1.59551 | 1.62588 | 1.62004 | 1.64769 |
| | 1.48749 | 1.48749 | 1.48749 | — | 1.64769 |

FIG. 11 is a schematic diagram illustrating main components of an image pickup apparatus (a television camera system) that uses a zoom lens according to any one of the first to fifth exemplary embodiments as a photographic optical system. A zoom lens 101 according to any one of the first to fifth exemplary embodiments is configured to be detachably attached to a camera 124. The image pickup apparatus 125 is configured by attaching the zoom lens 101 to the camera 124. The zoom lens 101 includes a front group LF including first to third lens units and a rear lens group Lr. Driving mechanisms 114 and 115 such as a helicoid or a cam are provided to drive each of the lens units in the direction of the optical axis.

Motors (driving units) 116 and 117 are provided to electrically drive the driving mechanisms 114 and 115 and an aperture stop (not illustrated). Although not illustrated in FIG. 11, a detector such as an encoder, a potentiometer, or a photo sensor is provided to detect the position of each lens unit along the optical axis or the aperture diameter of the aperture stop. The camera 124 includes a glass block 109, which corresponds to an optical filter or a color separation prism inside the camera 124, and a solid-state image sensor (a photoelectric conversion element) 110, such as a CCD sensor or a CMOS sensor, which is configured to receive an object image formed by the zoom lens 101.

Further, CPUs 111 and 122 are provided to control various driving states of the camera 124 and the zoom lens 101. In this manner, the image pickup apparatus having high optical performance is realized by applying the zoom lens according to an exemplary embodiment of the invention to the television camera.

In this manner, according to the exemplary embodiments of the invention, it is possible to obtain a zoom lens having a wide angle of view and a high zoom ratio and having high optical performance throughout the entire zoom range and an image pickup apparatus including the same.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-262292 filed Nov. 25, 2010, which is hereby incorporated by reference herein in its entirety.

What is claimed is:
1. A zoom lens comprising:
a first lens unit having positive refractive power;
a second lens unit having negative refractive power;
a third lens unit having positive or negative refractive power; and
a rear lens group including one or more lens units,
wherein the first lens unit, the second lens unit, the third lens unit and the rear lens group are arranged in order from an object side to an image side along an optical axis of the zoom lens, wherein, during zooming from a wide-angle end to a telephoto end, the second lens unit moves along the optical axis so that a distance between the first lens unit and the second lens unit increases, wherein an aperture stop is provided on the image side of the second lens unit, and wherein, when a sum of relative anomalous partial dispersion $\Delta\theta gF$ of materials of negative lenses included in the second lens unit is indicated by $SUM(\Delta\theta gF_{2N})$, a sum of optical power of negative lenses formed of a material having relative anomalous partial dispersion $\Delta\theta gF$ that is equal to or more than an average value of relative anomalous partial dispersion $\Delta\theta gF$ of the materials of the negative lenses included in the second lens unit is indicated by $\phi_{2SUM}$, and an optical power of the second lens unit is indicated by $\phi_2$, the following conditions are satisfied:

$$0.065 < SUM(\Delta\theta gF_{2N}) < 0.200$$

$$0.4 < \phi_{2SUM}/\phi_2 < 2.0.$$

2. The zoom lens according to claim 1, wherein the second lens unit includes a negative lens formed of a material satisfying a condition of $70 < \upsilon_{2N} < 100$ when an Abbe number of the material of the negative lens is indicated by $\upsilon_{2N}$.

3. The zoom lens according to claim 1, wherein, when a sum of relative anomalous partial dispersion $\Delta\theta gF$ of materials of positive lenses included in the first lens unit is indicated by $SUM(\Delta\theta gF_{1P})$, the following condition is satisfied:

$$0.030 < SUM(\Delta\theta gF_{1P}) < 0.300.$$

4. The zoom lens according to claim 1, wherein, when a focal length of the first lens unit is indicated by $f_1$, a focal length of the second lens unit is indicated by $f_2$, a focal length of the third lens unit is indicated by $f_3$, a focal length of the entire zoom lens at the wide-angle end is indicated by $f_w$, and a focal length of the entire zoom lens at the telephoto end is indicated by $f_t$, the following conditions are satisfied:

$$2.0 < f_1/\sqrt{(f_w \times f_t)} < 10.0$$

$$-1.5 < f_2/\sqrt{(f_w \times f_t)} < -0.5$$

$$-10.0 < f_1/f_2 < -1.0$$

$$0.05 < |f_2/f_3| < 0.60.$$

5. The zoom lens according to claim 1, wherein the rear lens group includes a fourth lens unit having positive refractive power at the most object side, and wherein during zooming from the wide-angle end to the telephoto end, the second lens unit monotonously moves towards the image side, the third lens unit moves along a locus that is of convex shape towards the object side so that a distance between the third lens unit and the second lens unit changes, and the fourth lens unit moves so that a distance between the fourth lens unit and the third lens unit changes.

6. The zoom lens according to claim 1, wherein the second lens unit includes, in order from the object side to the image side, a negative lens having a concave surface facing the image side, a negative lens having a concave surface facing the image side, and, on the image side thereof, two or more negative lenses and one or more positive lenses disposed in no particular order.

7. The zoom lens according to claim 1, wherein, when a relative anomalous partial dispersion of a material of at least one positive lens of positive lenses included in the second lens unit is indicated by $\Delta\theta gF_{2P}$ and a refractive index of the material of at least one positive lens of the positive lenses included in the second lens unit is indicated by $N_{2P}$, the following conditions are satisfied:

$$-0.050 < \Delta\theta gF_{2P} < 0.017$$

$$1.40 < N_{2P} < 1.70.$$

8. The zoom lens according to claim 1, wherein the second lens unit includes, in order from the object side to the image side, a negative lens having a concave surface facing the image side, a negative lens having a concave surface facing the image side, a cemented lens obtained by cementing a positive lens and a negative lens, and a cemented lens obtained by cementing a positive lens and a negative lens.

9. The zoom lens according to claim 1, wherein the second lens unit includes, in order from the object side to the image side, a negative lens having a concave surface facing the image side, a negative lens having a concave surface facing the image side, a negative lens, a negative lens, and a positive lens.

10. An image pickup apparatus comprising:
a zoom lens; and
a solid-state image sensor configured to receive an image formed by the zoom lens,
wherein the zoom lens includes, in order from an object side to an image side:
a first lens unit having positive refractive power;
a second lens unit having negative refractive power;
a third lens unit having positive or negative refractive power; and
a rear lens group including one or more lens units,
wherein during zooming from a wide-angle end to a telephoto end, the second lens unit moves along an optical axis so that a distance between the first lens unit and the second lens unit increases,
wherein an aperture stop is provided on the image side of the second lens unit, and
wherein, when a sum of relative anomalous partial dispersion $\Delta\theta gF$ of materials of negative lenses included in the second lens unit is indicated by $SUM(\Delta\theta gF_{2N})$, a sum of power of negative lenses formed of a material having relative anomalous partial dispersion $\Delta\theta gF$ that is equal to or more than an average value of relative anomalous partial dispersion $\Delta\theta gF$ of the materials of the negative lenses included in the second lens unit is indicated by $\phi_{2SUM}$, and an optical power of the second lens unit is indicated by $\phi_2$, the following conditions are satisfied:

$$0.065 < SUM(\Delta\theta gF_{2N}) < 0.200$$

$$0.4 < \phi_{2SUM}/\phi_2 < 2.0.$$

* * * * *